US009774364B2

(12) United States Patent
Shih

(10) Patent No.: US 9,774,364 B2
(45) Date of Patent: Sep. 26, 2017

(54) INTERFERENCE PHASE ESTIMATE SYSTEM AND METHOD

(71) Applicant: Futurewei Technologies, Inc., Plano, TX (US)

(72) Inventor: Huei Yuan Shih, Murphy, TX (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 15/252,819

(22) Filed: Aug. 31, 2016

(65) Prior Publication Data

US 2017/0070258 A1 Mar. 9, 2017

Related U.S. Application Data

(60) Provisional application No. 62/214,394, filed on Sep. 4, 2015.

(51) Int. Cl.
| H04B 1/48 | (2006.01) |
| H04L 27/148 | (2006.01) |
| H04L 27/20 | (2006.01) |
| H04B 1/525 | (2015.01) |

(52) U.S. Cl.
CPC ........... *H04B 1/48* (2013.01); *H04B 1/525* (2013.01); *H04L 27/148* (2013.01); *H04L 27/2007* (2013.01); *H04B 2001/485* (2013.01)

(58) Field of Classification Search
CPC .... H04B 1/48; H04B 1/525; H04B 2001/485; H04L 27/148; H04L 27/2007
USPC .......................................................... 455/78
See application file for complete search history.

(56) References Cited

U.S. PATENT DOCUMENTS

| 4,143,322 A | * | 3/1979 | Shimamura | ......... H04L 27/2273 329/308 |
| 4,481,645 A | * | 11/1984 | Karabinis | .............. H04B 7/005 327/100 |
| 5,193,102 A | * | 3/1993 | Meidan | .................. H03M 13/25 375/132 |

(Continued)

FOREIGN PATENT DOCUMENTS

CN 104796170 7/2015

OTHER PUBLICATIONS

Alvarino, K.M., "Tomorrow's RF Chips for Mobile Devices", CS Europe 2012 Conference, Frankfurt Germany, March 12, 2012, 20 pages.

*Primary Examiner* — Hai V Nguyen
(74) *Attorney, Agent, or Firm* — Slater Matsil, LLP

(57) ABSTRACT

A method for operating a transceiver includes generating, by the transceiver, a first signal that includes an estimate of an interference signal leaked from a transmit path to a receive path of the transceiver. Generating the first signal includes obtaining a baseband transmit signal that includes a baseband of a transmit signal transmitted via the transmit path. Generating the first signal also includes calculating a harmonic phase that includes a phase of a harmonic of the baseband transmit signal. Generating the first signal also includes estimating a phase shift in accordance with an envelope of the baseband transmit signal. Generating the first signal also includes determining a phase of the first signal in accordance with the estimated phase shift and the calculated harmonic phase such that interference of a receive signal received via the receive path is reduced according to the first signal.

29 Claims, 31 Drawing Sheets

(56) References Cited

U.S. PATENT DOCUMENTS

| | | | | |
|---|---|---|---|---|
| 5,204,682 A * | 4/1993 | Beasley | | G01S 13/60 342/117 |
| 6,191,724 B1 * | 2/2001 | McEwan | | G01S 7/35 342/118 |
| 6,519,295 B1 * | 2/2003 | Limberg | | H03D 1/24 348/725 |
| 6,643,334 B1 * | 11/2003 | Limberg | | H03J 7/02 348/726 |
| 6,717,980 B1 * | 4/2004 | Rishi | | H04B 1/525 375/219 |
| 7,035,341 B2 * | 4/2006 | Mohindra | | H04L 27/3809 375/261 |
| 7,043,208 B2 * | 5/2006 | Nigra | | H04B 1/525 455/295 |
| 7,933,555 B2 * | 4/2011 | Moloudi | | H03B 21/01 455/114.3 |
| 7,995,973 B2 * | 8/2011 | Dent | | H04B 1/525 375/260 |
| 8,086,188 B2 * | 12/2011 | Tanaka | | H04B 1/28 455/118 |
| 8,135,348 B2 * | 3/2012 | Aparin | | H04B 1/525 455/296 |
| 8,195,103 B2 * | 6/2012 | Waheed | | H04B 1/0475 455/114.3 |
| 8,407,545 B2 * | 3/2013 | Kubota | | H04L 27/3863 714/746 |
| 8,494,568 B2 * | 7/2013 | Husted | | H04B 1/1027 455/501 |
| 8,744,026 B2 * | 6/2014 | Rosenqvist | | H04L 25/023 375/260 |
| 8,824,589 B2 * | 9/2014 | Zhao | | H04L 25/03019 375/279 |
| 8,831,530 B2 * | 9/2014 | Cheng | | H04B 17/318 375/148 |
| 8,855,580 B2 * | 10/2014 | Dent | | H04B 1/525 455/114.2 |
| 8,861,579 B2 * | 10/2014 | Dark | | H04L 1/248 375/224 |
| 8,923,453 B2 * | 12/2014 | Schlegel | | H04L 25/03171 375/346 |
| 8,929,934 B2 * | 1/2015 | Chirayil | | H04W 24/08 370/318 |
| 8,938,025 B2 * | 1/2015 | Dark | | H04L 1/248 375/296 |
| 9,020,454 B2 * | 4/2015 | Waheed | | H04B 1/0475 455/114.3 |
| 9,025,646 B2 * | 5/2015 | Aparin | | H04B 1/40 375/219 |
| 9,055,529 B2 * | 6/2015 | Shih | | H04W 52/0209 |
| 9,071,337 B2 * | 6/2015 | Hellsten | | G01S 7/006 |
| 9,356,632 B2 * | 5/2016 | Weissman | | H04B 17/354 |
| 9,374,291 B2 * | 6/2016 | Murphy | | H04L 43/50 |
| 9,485,039 B1 * | 11/2016 | Malkin | | H04B 17/21 |
| 9,490,866 B2 * | 11/2016 | Goel | | H04B 1/525 |
| 9,525,453 B2 * | 12/2016 | Sarrigeorgidis | | H04B 1/12 |
| 9,571,205 B1 * | 2/2017 | Suarez | | G02F 2/002 |
| 9,621,236 B2 * | 4/2017 | Ghannouchi | | H04B 7/0417 |
| 2005/0123079 A1 * | 6/2005 | Yamamoto | | H03J 1/0066 375/344 |
| 2005/0156780 A1 * | 7/2005 | Bonthron | | G01S 3/48 342/107 |
| 2007/0018718 A1 * | 1/2007 | Horng | | H03F 1/0227 330/10 |
| 2007/0190952 A1 * | 8/2007 | Waheed | | H04B 1/0475 455/114.3 |
| 2007/0236297 A1 * | 10/2007 | Uozumi | | H03C 3/0925 331/16 |
| 2008/0118013 A1 * | 5/2008 | Vis | | H04B 1/40 375/354 |
| 2008/0119140 A1 * | 5/2008 | Maligeorgos | | H04B 15/02 455/67.13 |
| 2010/0120377 A1 * | 5/2010 | He | | H03D 7/1441 455/77 |
| 2010/0159837 A1 * | 6/2010 | Dent | | H04B 1/525 455/63.1 |
| 2010/0220780 A1 * | 9/2010 | Peng | | H04B 1/525 375/232 |
| 2010/0260077 A1 * | 10/2010 | Nakatani | | H04B 1/525 370/278 |
| 2010/0313094 A1 * | 12/2010 | Kubota | | H04L 27/3863 714/746 |
| 2011/0255575 A1 | 10/2011 | Zhu et al. | | |
| 2012/0051470 A1 * | 3/2012 | Schlegel | | H04J 11/0036 375/341 |
| 2012/0207252 A1 * | 8/2012 | Levesque | | H02M 3/07 375/342 |
| 2012/0263256 A1 * | 10/2012 | Waheed | | H04B 1/0475 375/296 |
| 2014/0270015 A1 * | 9/2014 | Kravtsov | | H04L 25/03821 375/343 |
| 2015/0065058 A1 * | 3/2015 | Wang | | H04B 15/00 455/63.1 |
| 2015/0099564 A1 * | 4/2015 | Shih | | H04W 52/0209 455/574 |
| 2015/0180685 A1 * | 6/2015 | Noest | | H04B 1/0475 375/219 |
| 2015/0303984 A1 * | 10/2015 | Braithwaite | | H04B 1/525 455/78 |
| 2015/0311928 A1 * | 10/2015 | Chen | | H04B 1/525 375/350 |
| 2015/0311929 A1 * | 10/2015 | Carbone | | H04B 1/1027 455/78 |
| 2015/0318976 A1 * | 11/2015 | Eltawil | | H04B 1/123 370/278 |
| 2015/0358047 A1 * | 12/2015 | Sarrigeorgidis | | H04B 1/12 455/78 |
| 2015/0381468 A1 * | 12/2015 | Murphy | | H04L 43/50 375/227 |
| 2016/0285502 A1 * | 9/2016 | Liu | | H04B 1/525 |
| 2016/0294601 A1 * | 10/2016 | Frederick | | H04L 27/367 |
| 2017/0005773 A1 * | 1/2017 | Liu | | H04B 1/525 |
| 2017/0033964 A1 * | 2/2017 | Shih | | H04L 1/1657 |

\* cited by examiner

INTERFERENCE PHASE ESTIMATE SYSTEM AND METHOD

CROSS-REFERENCE TO RELATED APPLICATIONS

This application claims the benefit of U.S. Provisional Application No. 62/214,394, filed on Sep. 4, 2015, which application is hereby incorporated herein by reference.

TECHNICAL FIELD

The present invention relates generally to a system and method for estimating interference, and, in particular embodiments, to a system and method for estimated interference phase.

BACKGROUND

Advanced cellular networks such as Long Term Evolution (LTE) Advanced networks are being developed that feature carrier aggregation. Carrier aggregation allows concurrent utilization of contiguous and non-contiguous spectrum allocations to support increased performance such as, for example, higher user bandwidth and throughput.

SUMMARY

In accordance with a first example embodiment of the present invention, a method for operating a transceiver is provided. The method includes generating, by the transceiver, a first signal that includes an estimate of an interference signal leaked from a transmit path to a receive path of the transceiver. Generating the first signal includes obtaining a baseband transmit signal that includes a baseband of a transmit signal transmitted via the transmit path. Generating the first signal also includes calculating a harmonic phase that includes a phase of a harmonic of the baseband transmit signal. Generating the first signal also includes estimating a phase shift in accordance with an envelope of the baseband transmit signal. Generating the first signal also includes determining a phase of the first signal in accordance with the estimated phase shift and the calculated harmonic phase such that interference of a receive signal received via the receive path is reduced according to the first signal.

In accordance with a second example embodiment of the present invention, a transceiver is provided. The transceiver includes at least one antenna. The transceiver also includes a transmit path that includes a first output coupled to the at least one antenna. The transceiver also includes a receive path coupled to the at least one antenna and to the transmit path. When a transmit signal is transmitted via the transmit path and a receive signal is received via the receive path, interference is leaked from the transmit signal to the receive signal. The transceiver also includes a look-up stage coupled to a baseband output of the transmit path. The look-up stage includes at least one of a memory or an integrated circuit. The transceiver also includes an adder coupled between an output of the look-up stage and a second input of the receive path. The look-up stage is configured to map a plurality of baseband transmit envelope values to a plurality of phase shift values. The adder includes an input configured to receive an estimated harmonic of the baseband transmit signal. The baseband transmit signal includes a baseband of the transmit signal.

In accordance with a third example embodiment of the present invention, an interference modeling system is provided. The interference modeling system includes a processor and a non-volatile computer readable medium storing programming for execution by the processor. The programming includes instructions for sampling, at a first time, a baseband transmit signal that includes a baseband of a transmit signal, to obtain baseband transmit samples. The baseband transmit samples include samples of a baseband transmit phase and samples of a baseband transmit envelope. The programming also includes instructions for sampling, at the first time, an interference signal generated by a harmonic of the transmit signal to obtain interference samples corresponding to the baseband transmit samples. The interference samples include interference phase samples and samples of an interference envelope. The programming also includes instructions for calculating values of a phase shift corresponding to the baseband transmit envelope samples, in accordance with the interference phase samples and the baseband transmit phase samples. The programming also includes instructions for applying a first interpolation, in accordance with the phase shift values and the baseband transmit envelope samples, to determine a first relationship that maps the transmit baseband envelope to the phase shift.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In various embodiments, a transceiver in a telecommunications network (e.g., a cellular system) may transmit and receive simultaneously in different frequency bands. Interference on a receive signal in a receiver may be induced by self-jamming leakage of transmit signals that are simultaneously transmitted by a transmitter of the device. The transmit signals may leak into the receive path through the finite isolation between the transmit and receive paths. For example, in embodiments featuring LTE band 4 (B4)/band 17 (B17) carrier aggregation, the 3rd harmonic noise generated by non-linearities of the B17 transmit (TX) spectrum falls into the B4 receive (RX) spectrum, thus creating co-channel interference. This co-channel interference may degrade B4 RX sensitivity. The RX in-band interference typically cannot be filtered out, but in various embodiments the interference may be reduced using baseband reduction.

One exemplary approach to 3rd harmonic reduction involves modeling the 3rd harmonic noise with a complex polynomial and then subtracting the modeled noise from the RX baseband signal. The following reference is related to the subject matter of the present application and is incorporated herein by reference in its entirety:

U.S. Patent Application Publication No. 2015/0065058 A1, "Non-Linear Interference Reduction with Multiple Aggressors" (Mar. 5, 2015).

In various embodiments, an alternative approach models the kth harmonic of the TX signal (where k is a positive integer greater than 1) using near instantaneous characterization via mappings between the TX envelope and the kth harmonic envelope and kth harmonic phase shift. This near instantaneous characterization of this alternative approach supports more effective reduction of co-channel interference from the baseband RX signal.

Figure 1:
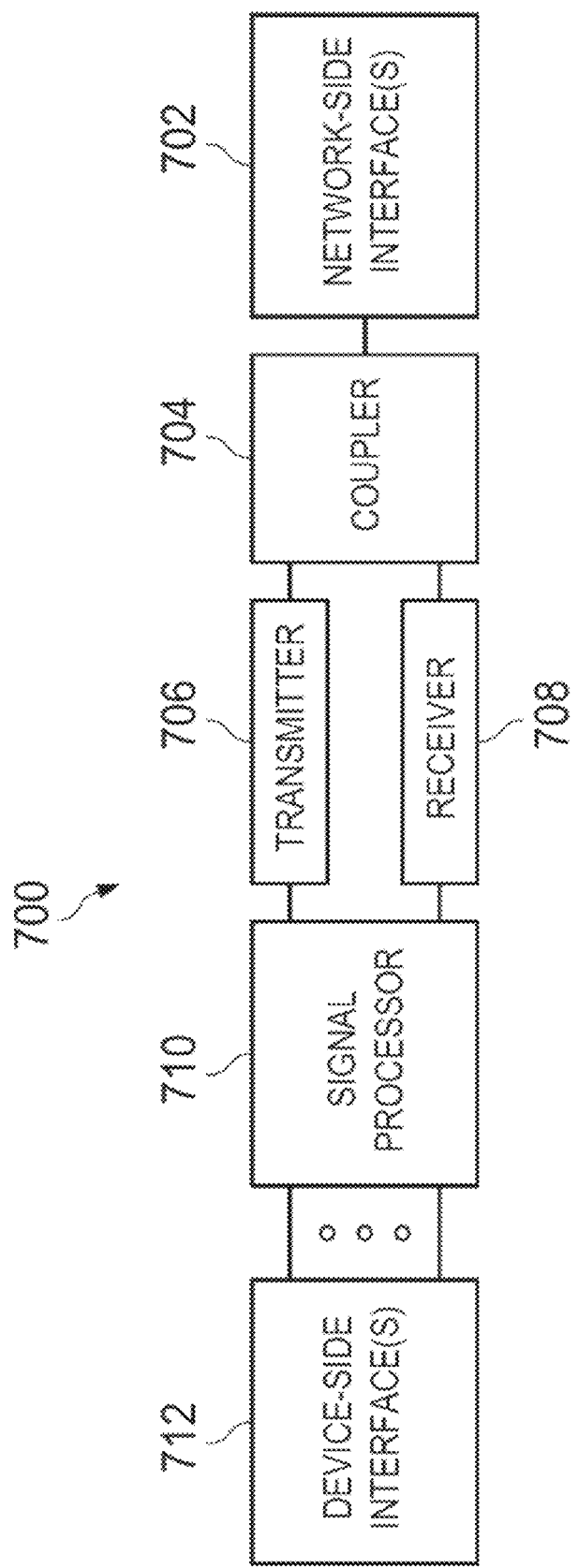
FIG. 1 illustrates a block diagram of an embodiment transceiver adapted to transmit and receive signaling over a telecommunications network.

FIG. 1 illustrates a block diagram of an embodiment transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., processing system 600 of FIG. 29, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., LTE, etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In an embodiment, the transceiver 700 includes a modeling stage. The modeling stage has a modeling stage output configured to provide an interference phase estimate that approximates an interference signal generated by a harmonic of a transmit signal. The modeling stage also includes a first look-up table (LUT) including an input coupled to a baseband of the transmit signal. The first LUT maps a plurality of baseband transmit envelope values to a plurality of phase shift values, each of the plurality of phase shift values including a difference between an estimate of a phase of the interference signal relative to a harmonic of the baseband transmit signal.

Figure 2:
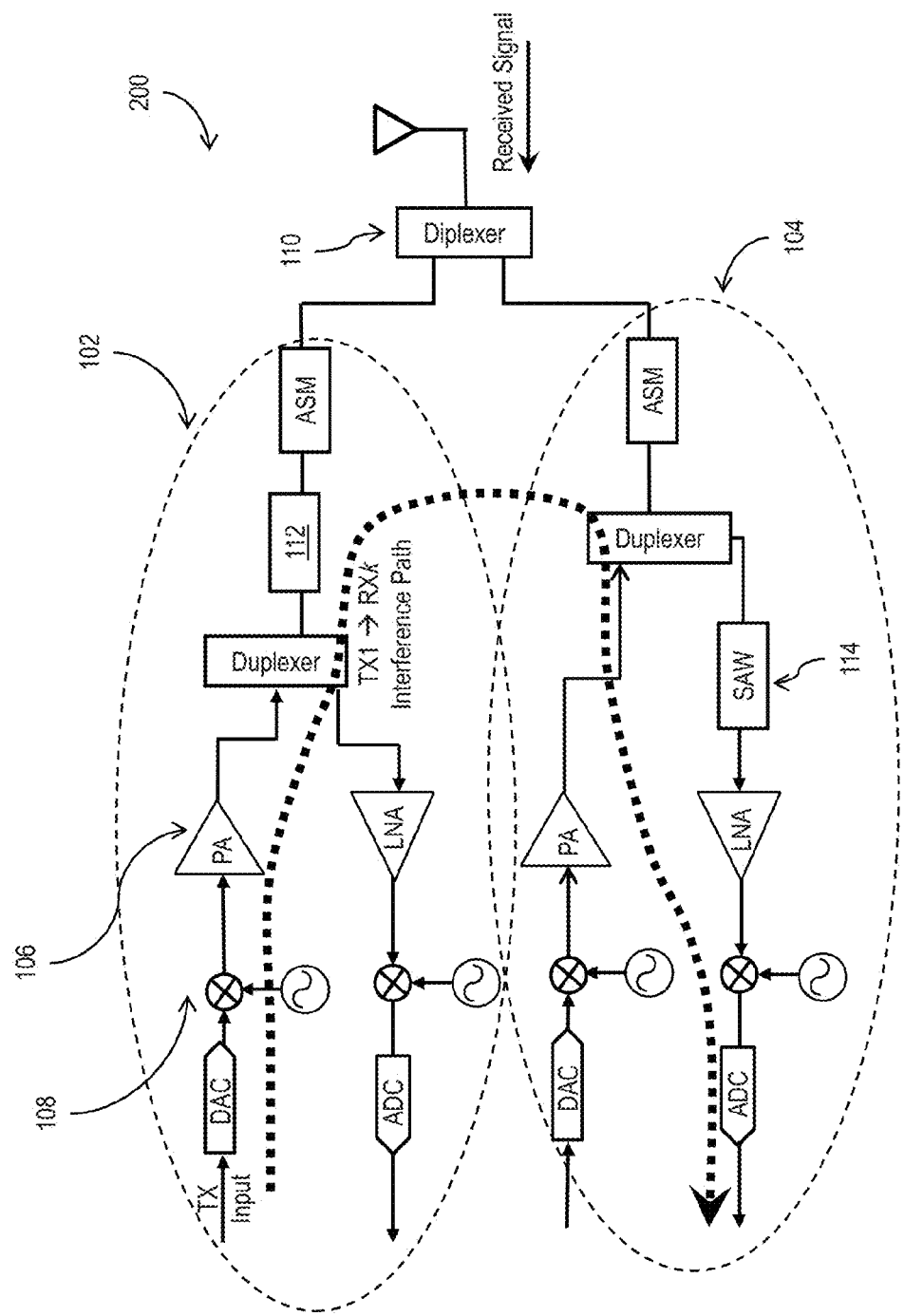
FIG. 2 illustrates an embodiment transmit/receive stage that may be used in the transceiver of FIG. 1.

FIG. 2 illustrates an embodiment transmit/receive stage 200 that may be used to implement the transmitter 706, the receiver 708, the coupler 704, and the network-side interface 702 of FIG. 1. Stage 200 includes a transmit path 102 and receive path 104. Transmit-to-receive (TX-to-RX) interference is leaked from the transmit path 102 to the receive path 104. In the embodiment of FIG. 2, the receive path 104 uses a band RXk centered on a frequency that is near a positive integer k>1 times the center frequency of the band TX1 used by the transmit path 102. Thus, kth harmonic noise near the receive band center frequency is leaked from the transmit path 102 via the diplexer 110. This harmonic noise generally is generated in the transmit path 102 by the non-linearity of the power amplifier (PA) 106 and the up-converter 108. The PA may be, for example, an envelope tracking PA (ETPA), a class AB PA, etc. A notch filter 112 included in the transmit path 102 can partially reduce the kth harmonic noise, but at the expense of degrading transmit performance. The receive path 104 includes a surface acoustic wave (SAW) device 114, but this SAW device 114 is not capable of rejecting the in-band distortion caused by the kth harmonic noise.

Figure 3A:
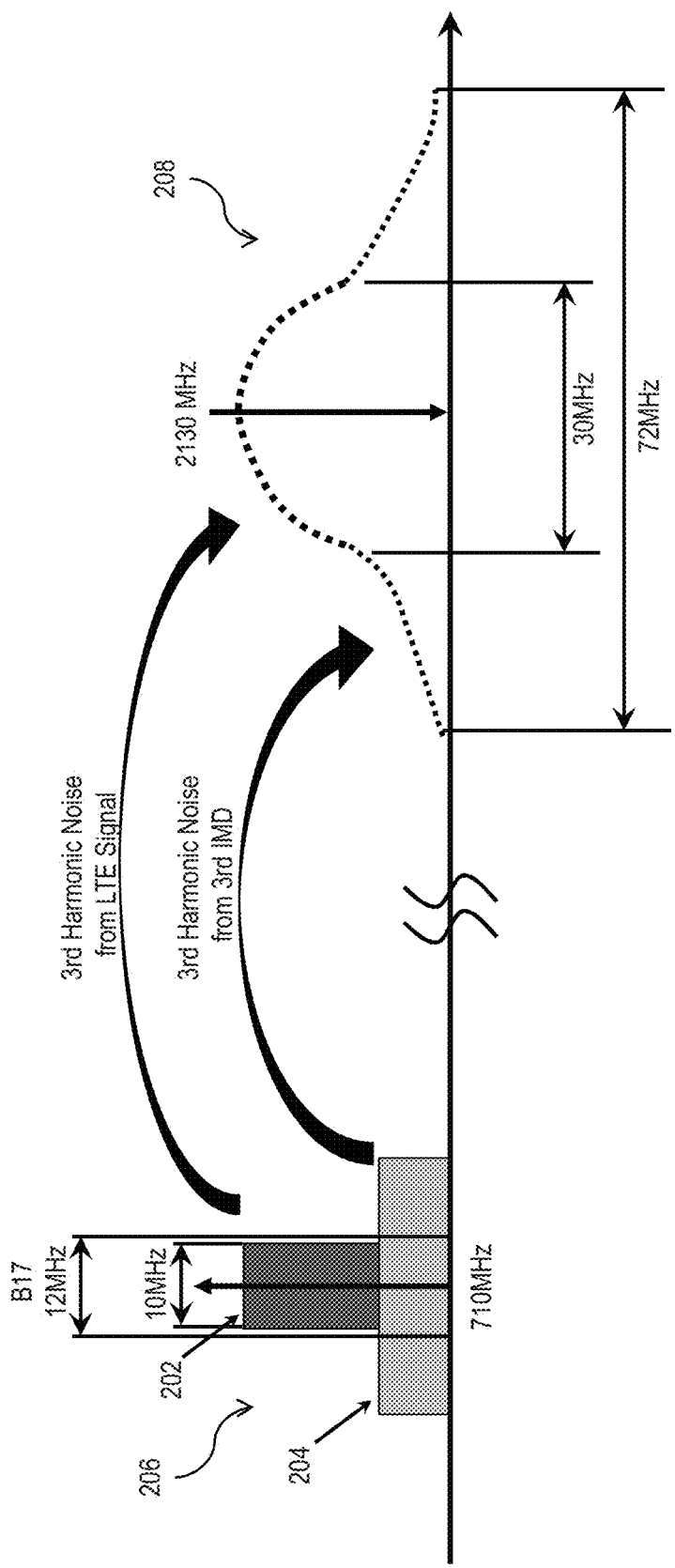
FIG. 3A is a graph illustrating exemplary 3rd harmonic noise.

A specific example of kth harmonic noise is shown in FIG. 3A, which illustrates a spectrum analysis of exemplary 3rd harmonic noise for a 10-MHZ wide transmit signal 202 to be transmitted over the B17 frequency band. Transmit signal 202 may be, for example, an LTE transmit signal, another information-bearing signal, etc. B17 is located in the 12-MHz band from 704 to 716 MHz, and it has a center frequency of 710 MHz. The transmit path 102 (shown in FIG. 1) also generates a 3rd inter-modulation distortion (IMD) signal 204 centered at 710 MHz. The transmit signal 202 and the 3rd IMD signal 204 are components of a combined TX signal 206, and both of these component signals generate 3rd harmonic noise.

Referring again to FIG. 3A, the 3rd harmonic noise 208 generated from the combined TX signal 206 is centered at 2130 MHz and has a bandwidth of 72 MHz. The 3rd harmonic noise generated from the transmit signal 202 has a bandwidth of 30 MHz, which is three times the bandwidth of the original 10 MHz-wide transmit signal 202.

Figure 3B:
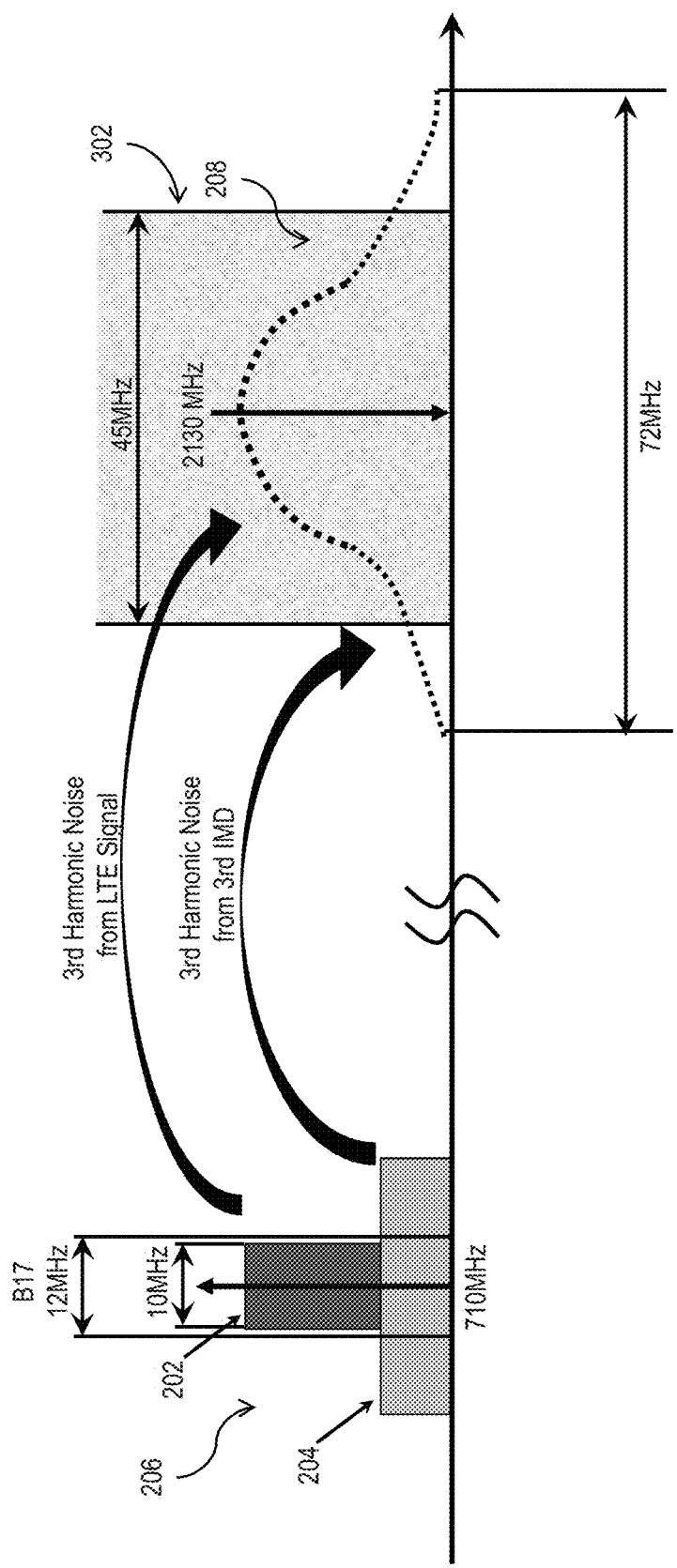
FIG. 3B is a graph illustrating exemplary TX-to-RX interference caused by the 3rd harmonic noise of FIG. 3A.

FIG. 3B is a graph illustrating a spectrum analysis of exemplary TX-to-RX interference caused by the 3rd harmonic noise 208 of FIG. 3A. The B4 RX band 302 is located in the 45 MHz band from 2110 to 2155 MHz. This entire B4 RX band 302 is jammed by the 72 MHz-wide 3rd harmonic noise 208.

Figure 4:
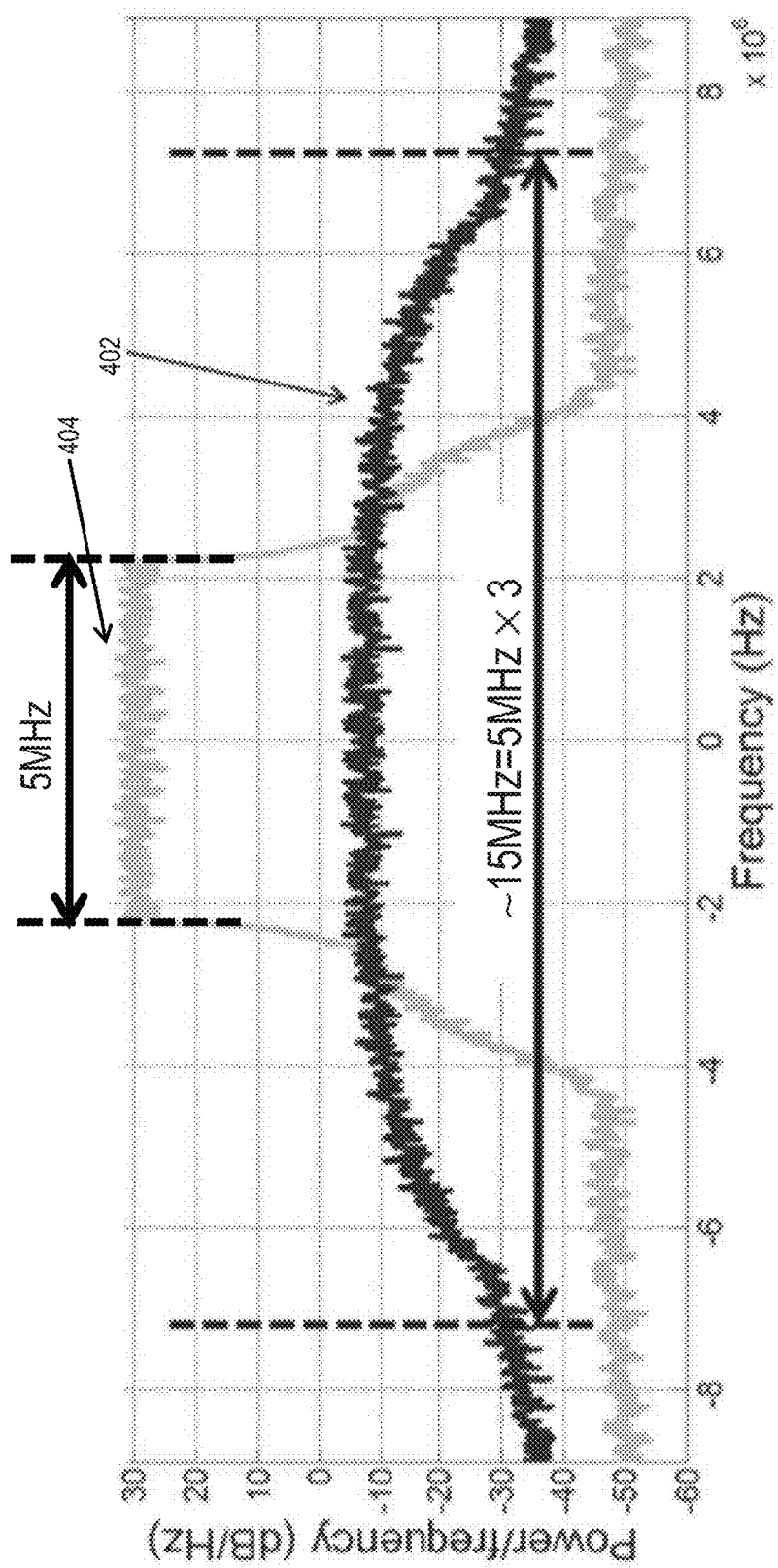
FIG. 4 is a spectrum analysis illustrating a second example of TX-to-RX interference.

FIG. 4 is a graph illustrating a spectrum analysis of a second example of B17/B4 interference. In this example, a 3rd harmonic interference signal 402 includes an approximately 15 MHZ-wide portion 403 that is caused by B17 transmission of a 5 MHz-wide LTE transmit signal 404, and that is approximately three times the bandwidth of the transmit signal 404. This transmission of transmit signal 404 is via an embodiment of transmit path 102 (shown in FIG. 1) that uses an RF8081 ETPA as the PA 106. The 3rd harmonic interference 402 is captured at 2.13 GHz center frequency (i.e., B4 center frequency). The ETPA is operating at 710 MHz (i.e., B17 center frequency). After digital pre-distortion (DPD) linearization, the ETPA is 42% efficient with −39 dBc adjacent channel leakage ratio (ACLR).

Figure 5:
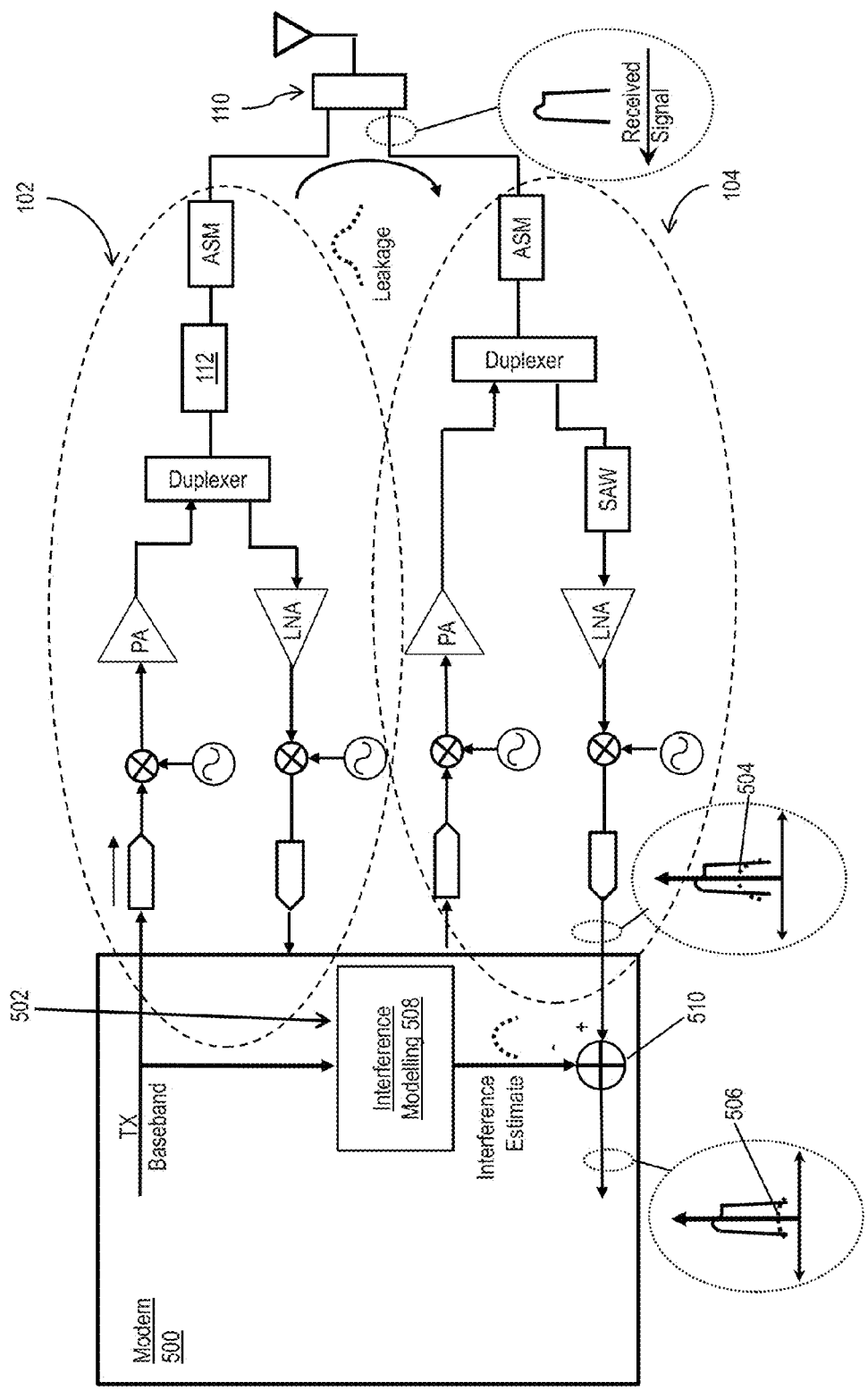
FIG. 5 is a block diagram illustrating an embodiment interference reduction device for the TX-to-RX interference scenario of FIG. 1.

FIG. 5 illustrates a block diagram for an embodiment interference reduction device for the TX-to-RX interference scenario of FIG. 1. A baseband of a transmit signal is provided to transmit path 102 as an output of a modem 500, which includes an interference modeling stage 508. The baseband transmit signal is also provided to the interference modeling stage 508 for real-time processing. The interference modeling stage 508 uses this baseband transmit signal to generate an interference estimate that is provided to an interference reduction stage 510, which may be implemented using, e.g., a processor executing software, an adder-subtractor circuit, etc. The interference reduction stage 510 also receives a baseband signal from the receive path 104, and this baseband signal includes interference 504 that is leaked from the transmit path 102 to the receive path 104. The interference reduction stage 510 subtracts the interference estimate from the receive path's output baseband signal, which results in a signal having reduced interference 506.

Figure 6:
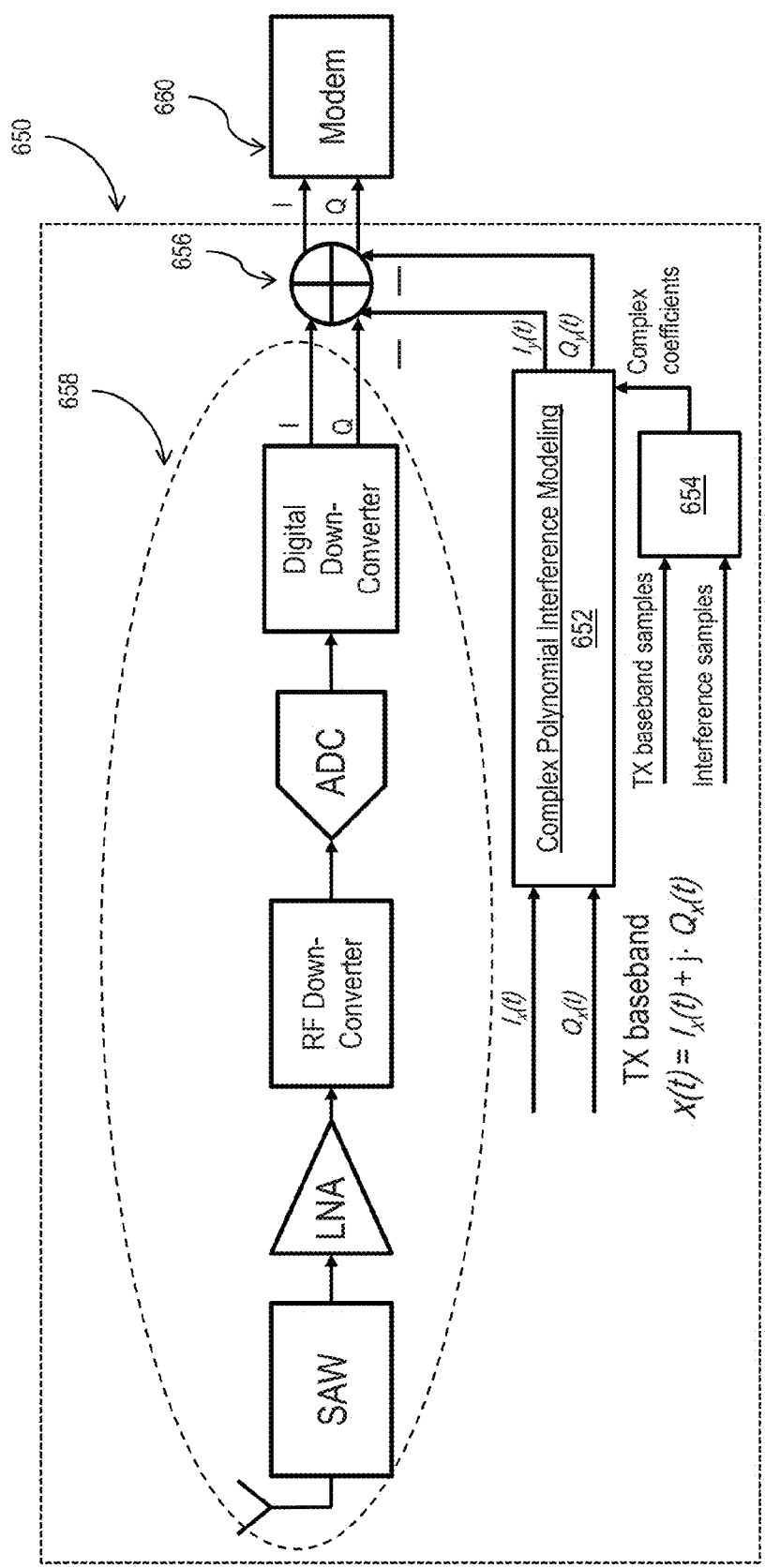
FIG. 6 is a block diagram illustrating an exemplary 3rd harmonic reduction system that uses a complex polynomial technique to estimate interference.

FIG. 6 is a block diagram illustrating an exemplary 3rd harmonic reduction system 650 that uses a complex polynomial technique to estimate interference. A complex polynomial interference modeling stage 652, which is included in the reduction system 650, receives, in real-time, an in-phase component $I_x(t)$ and a quadrature $Q_x(t)$ component of a complex TX baseband signal $x(t)=I_x(t)+j \cdot Q_x(t)$. The interference modeling stage 652 then generates interference estimate component signals $I_y(t)$ and $Q_y(t)$. In the example of FIG. 6, the interference modeling stage generates these estimated components using an interference model Y that is a function of complex coefficients $\theta_n$ and 3rd harmonic polynomial kernels $H_3(n)$, where n is the order of the polynomial kernel. This interference model Y, which includes 1st, 3rd, 5th, 7th, and 9th-order kernels, is shown in Equation 1:

$$Y = H_3(1) \cdot \theta_1 + H_3(3) \cdot \theta_3 + H_3(5) \cdot \theta_5 + H_3(7) \cdot \theta_7 + H_3(9) \cdot \theta_9 + \ldots \quad \text{(Eq. 1)}$$

The complex polynomial kernels $H_k(n)$ are derived in real time by the interference modeling stage 652 according to Equation 2, using a harmonic order of k=3 for 3rd harmonic reduction:

$$H_k(n) = (I(t) - jQ(t))^k |(I(t) - jQ(t))|^{(n-k)} \quad \text{(Eq. 2)}$$

Before the interference modeling stage 652 can perform real-time processing of a TX baseband signal, it must be initialized with the complex coefficients $\theta_n$. In the example of FIG. 6, a parameter estimating stage 654 estimates a complex coefficient vector $\Theta = [\theta_1, \theta_3, \ldots, \theta_n]^T$ in advance and then provides it to the interference modeling stage 654. The parameter estimating stage 654 estimates these complex coefficients offline by measuring N samples of the 3rd harmonic interference Y=[y(1), y(2), . . . , y(N)] that are produced by N samples of the TX baseband signal X=[x(1), x(2), . . . , x(N)]. The parameter estimating stage 654 then uses the samples of the TX baseband signal and the 3rd harmonic interference signal to calculate an observation matrix H according to Equation 3:

$$H = \begin{bmatrix} H_3(1) & H_3(3) & H_3(5) & H_3(7) & \ldots & H_3(n) \end{bmatrix}$$

$$= \begin{bmatrix} x(1) & x^3(1) & x^3(1)|x(1)|^2 & x^3(1)|x(1)|^4 & \ldots & x^3(1)|x(1)|^{n-3} \\ x(2) & x^3(2) & x^3(2)|x(2)|^2 & x^3(2)|x(2)|^4 & \ldots & x^3(2)|x(2)|^{n-3} \\ x(3) & x^3(3) & x^3(3)|x(3)|^2 & x^3(3)|x(3)|^4 & \ldots & x^3(3)|x(3)|^{n-3} \\ \vdots & \vdots & \vdots & \vdots & \ldots & \vdots \\ x(N) & x^3(N) & x^3(N)|x(N)|^2 & x^3(N)|x(N)|^4 & \ldots & x^3(N)|x(N)|^{n-3} \end{bmatrix} \quad \text{(Eq. 3)}$$

The interference model of Equation 1 may then be rewritten in matrix form according to Equation 4:

$$Y = H \cdot \Theta \quad \text{(Eq. 4)}$$

In some examples, the coefficient vector $\Theta$ of Equation 4 may be calculated using a least squares algorithm. In the example of FIG. 6, the parameter estimating stage 654 uses a minimum mean square error (MMSE) algorithm to solve for the coefficient vector $\Theta$ as expressed in Equation 5:

$$\Theta = (H^T \cdot H)^{-1} \cdot (H \cdot Y) \quad \text{(Eq. 5)}$$

The interference modeling stage 652 then uses the coefficient vector $\Theta$ to calculate the interference estimate that it provides to subtraction stage 656. Subtraction stage 656 generates an output signal of the reduction system 650 by subtracting the interference estimate from the baseband output signal of RX path 658. The resulting output signal, which in some instances may have reduced interference, is then provided to modem 660.

Interference reduction using the complex polynomial technique of FIG. 6 depends on which model order (i.e., highest kernel order) is selected for the interference model of Equation 1. The correct model order to use is uncertain and often requires trial and error. Using too low a model order (i.e., under-fit) or using too high a model order (over-fit) can degrade the reduction performance dramatically.

The complex polynomial technique of FIG. 6 may also be combined with a DPD technique. This combined reduction system includes easily understood physical phenomena, but has the disadvantages of high power consumption, high cost, and the requirement for correct kernel selection. In some implementations of system 650, an on/off algorithm must be used to reduce power consumption.

Figure 7:
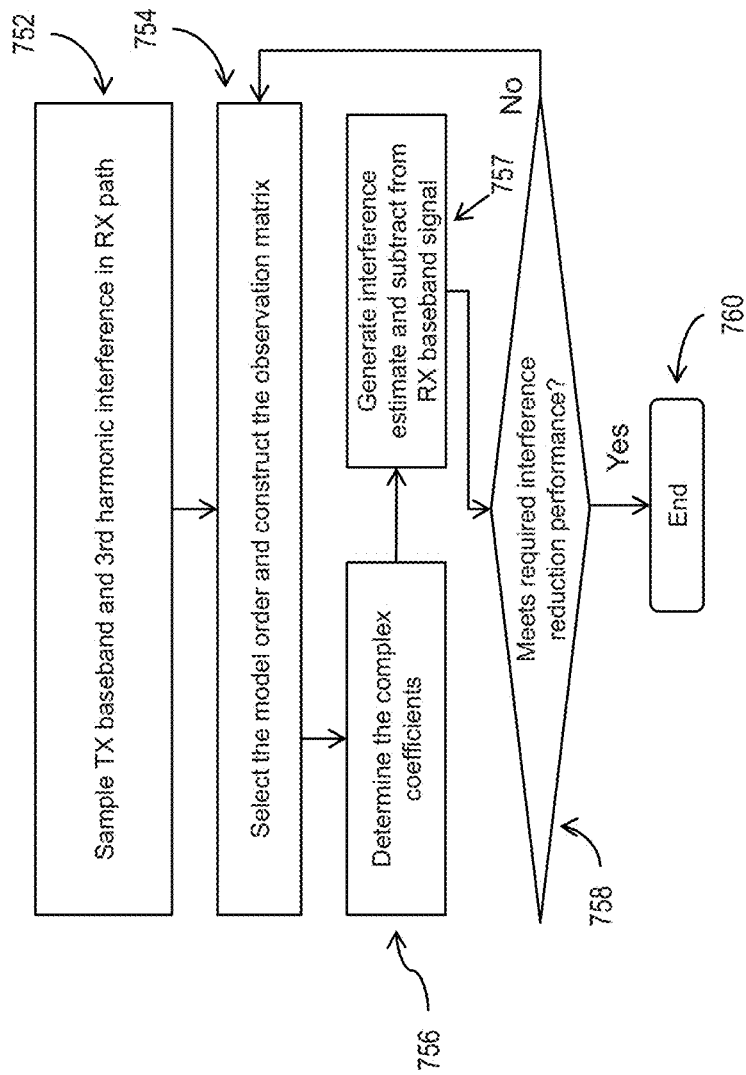
FIG. 7 is a flow chart illustrating a method of generating a 3rd harmonic interference estimate using a complex polynomial generator.

FIG. 7 illustrates a flow chart for an exemplary method of generating a 3rd harmonic interference estimate using a complex polynomial generator and a minimum mean square error (MMSE) method for determining the complex coefficients. The method begins at step 752, in which an oversampling rate greater than 4 is used to sample the TX baseband signal and to capture 3rd harmonic interference in the RX path in synchronicity with the TX baseband signal. Flow then continues at step 754, where a model order is selected and an observation matrix is constructed for the selected model order. Flow then continues at step 756, where complex polynomial coefficients are determined using an MMSE algorithm to solve Equation 5. Flow then continues at step 757, where the interference estimate is generates from the complex polynomial coefficients, and this interference estimate is subtracted from the RX baseband signal. Flow then continues at step 758, where reduction performance is compared to a required reduction performance. If the required reduction performance is met, the method ends at step 760. If the required reduction performance is not met, however, flow returns to step 754, where a different model order is selected and the observation matrix is constructed for the newly selected model order.

Figure 8:
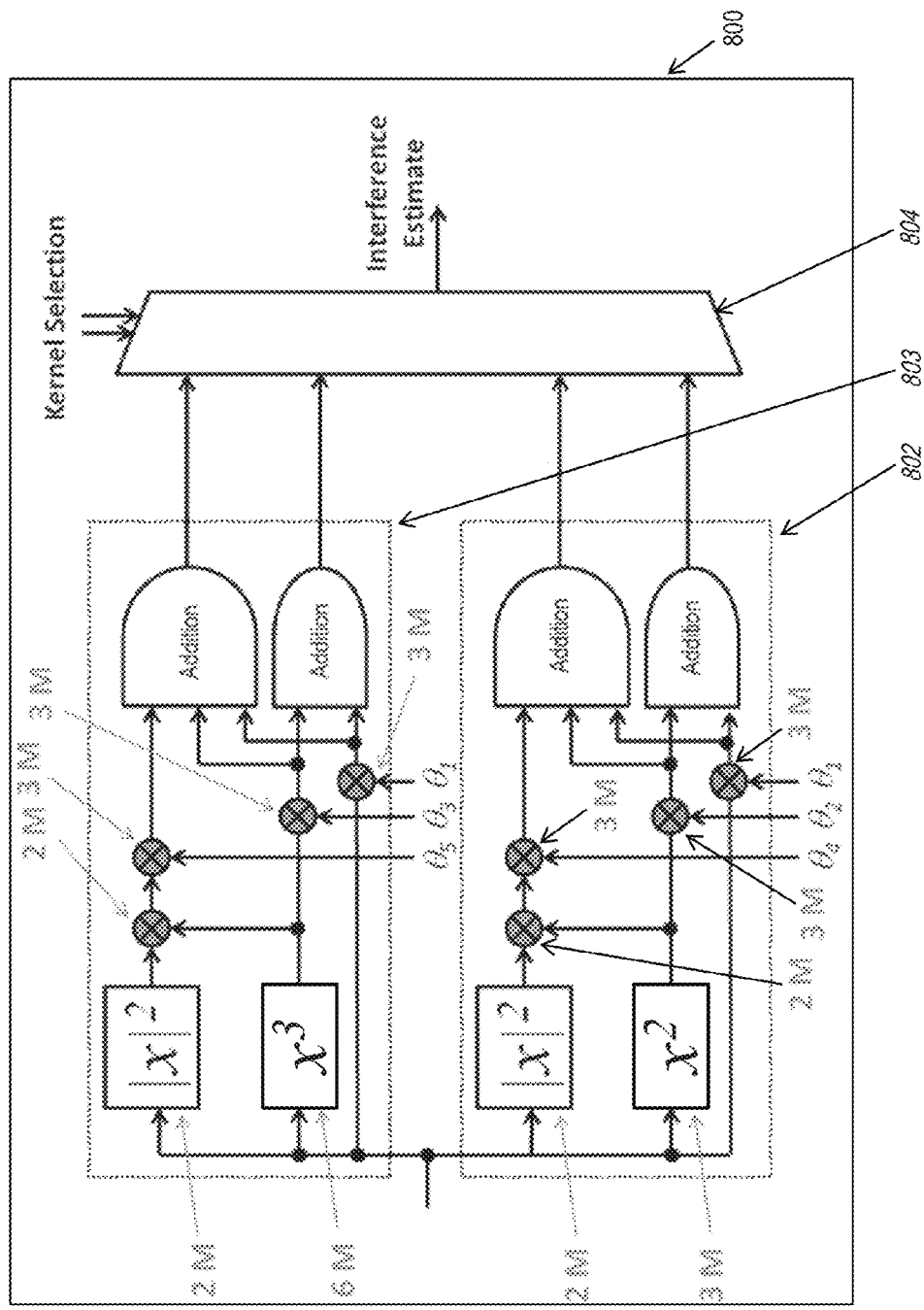
FIG. 8 is a block diagram illustrating an exemplary chipset for estimating both 2nd harmonic interference and 3rd harmonic interference using a complex polynomial technique.

FIG. 8 illustrates an exemplary chipset 800 for estimating both 2nd harmonic interference and 3rd harmonic interference using the complex polynomial technique. The TX baseband signal is provided to a 2nd harmonic interference modeling stage 802 and to a 3rd harmonic interference modeling stage 803, which are both included in the chipset 800. Interference modeling stage 803 receives as inputs complex coefficients $\theta_1$, $\theta_3$, and $\theta_5$ that have been calculated using an MMSE method. Stage 803 requires 19M total multiplications to output two 3rd harmonic interference estimates $Y_{3,n}$—one for each of model order n=3 and n=5, where n is the highest kernel order that is included in the interference model, and where M represents a 16-by-16 real multiplication. Stage 803 outputs these two estimates $Y_{3,3}$ and $Y_{3,5}$ according to Equation 6:

$$Y_{3,n} = (I(t) - jQ(t))^3 |(I(t) - jQ(t))|^{(n-3)} \quad \text{(Eq. 6)}$$

Interference modeling stage 802 receives as inputs complex coefficients $\theta_2$, $\theta_4$, and $\theta_6$ that have also been calculated using the MMSE method. Stage 802 requires 16M multiplications as it outputs respective 2nd harmonic interference estimates $Y_{2,n}$ according to Equation 7 for each of model order n=2 and n=4:

$$Y_{2,n} = (I(t) - jQ(t))^2 |(I(t) - jQ(t))|^{(n-2)} \quad \text{(Eq. 7)}$$

Kernel selection signals are provided to multiplexer 804 so that it may output a single output interference estimate for chipset 800, with this output being selected from among the two 2nd harmonic interference estimates and the two 3rd harmonic interference estimates. The chipset 800 requires 35M total multiplications to provide this output interference estimate. Interference reduction performance of chipset 800 is highly dependent on correct model order selection, which often must be determined by trial and error.

Figure 9:
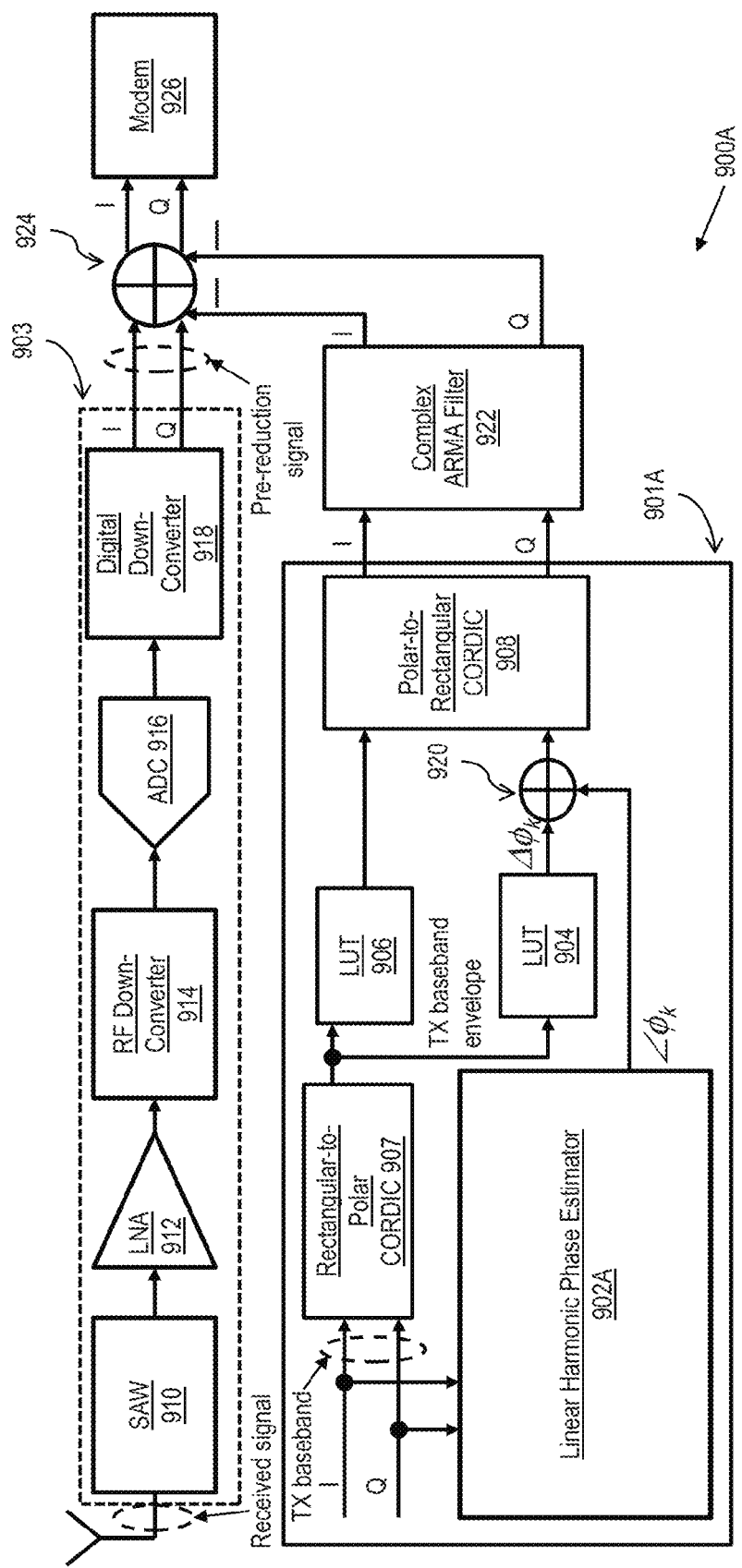
FIG. 9 is a block diagram illustrating an embodiment system for real-time kth harmonic interference reduction using an envelope/phase mapping technique.

FIG. 9 illustrates an embodiment system 900A for real-time kth harmonic interference reduction using an envelope/phase mapping technique. System 900A may be implemented using programming and/or instructions for execution by one or more processor(s) (e.g., processor 604 of FIG. 29), and/or other integrated circuit (IC) chip(s), including, e.g., a general purpose processor/microprocessor, a digital signal processor (DSP), an application-specific IC (ASIC), a field programmable gate array (FPGA) or another programmable logical device, a discrete gate or a transistor logical device, or a discrete hardware component.

A receive path 903 of system 900A outputs a pre-reduction signal by sequentially processing a received signal using a SAW 910, a low noise amplifier (LNA) 912, an RF down-converter 914, an analog-to-digital converter (ADC) 916, and a digital down-converter 918. The pre-reduction signal includes both I and Q components, although a person of ordinary skill would understand that, as with many information-bearing complex signals, the real I component and/or the imaginary Q component may at times be zero.

System 900A also includes an interference modeling stage 901A that includes a linear harmonic phase estimator 902A, an envelope-to-phase look up table (LUT) 904, an envelope-to-envelope LUT 906, and coordinate rotation digital computers (CORDICs) 907 and 908. Phase estimator 902A and CORDIC 907 both receive I and Q components of a TX baseband signal as input. Phase estimator 902A estimates a phase $\angle\phi_k$ of the kth harmonic of the polar TX baseband signal. CORDIC 907 receives the I and Q components of the TX baseband signal and converts this signal from rectangular to polar form.

This resulting polar TX baseband signal is provided to both LUT 904 and 906. LUT 906 outputs an estimated envelope of the TX-to-RX interference caused by the kth harmonic of the polar TX baseband signal (i.e., the kth harmonic interference envelope) using linear interpolation of a mapped relationship between this kth harmonic interference envelope and the envelope of the TX baseband signal. LUT 904 outputs an estimated phase shift $\Delta\phi_k$ between the kth harmonic TX phase $\angle\phi_k$ and the kth harmonic interference present in the pre-reduction signal that is outputted from receive path 903. LUT 904 estimates this phase shift $\Delta\phi_k$ using linear interpolation of a mapped relationship between this phase shift $\Delta\phi_k$ and the envelope of the polar TX baseband signal.

In an embodiment, LUTs 904 and 906 are implemented with linear interpolation functions using a total of 2M multiplications. In other embodiments, other interpolation techniques may be used in one or both of LUTs 904 and 906. The use of mapped envelope-phase and envelope-envelope relationships by LUTs 904 and 906, respectively, allows a chipset implementing system 900A to have increased flexibility relative to a chipset that implements a complex polynomial method (e.g., chipset Boo of FIG. 8).

Referring again to FIG. 9, adder 920, which is included in stage 901A, adds the harmonic phase shift $\Delta\phi_c$ to the harmonic TX phase estimate $\phi\phi_k$, resulting in an estimated phase of the TX-to-RX interference (i.e., the kth harmonic interference phase). The estimated kth harmonic interference phase and the estimated kth harmonic interference envelope are both provided to CORDIC 908. CORDIC 908 converts these signals from polar to rectangular form, resulting in I and Q components of a noisy interference estimate. This noisy interference estimate is provided to a complex auto-regressive-moving-average (ARMA) filter 922 that is included in system 900A. Filter 922 outputs I and Q components of a filtered interference estimate.

This filtered interference estimate is subtracted from the pre-reduction signal by an interference reduction stage 924 of system 900A, resulting in I and Q components of an RX baseband output having reduced TX-to-RX interference. This RX baseband output is then provided to Modem 926 that is included in system 900A.

Figure 10:
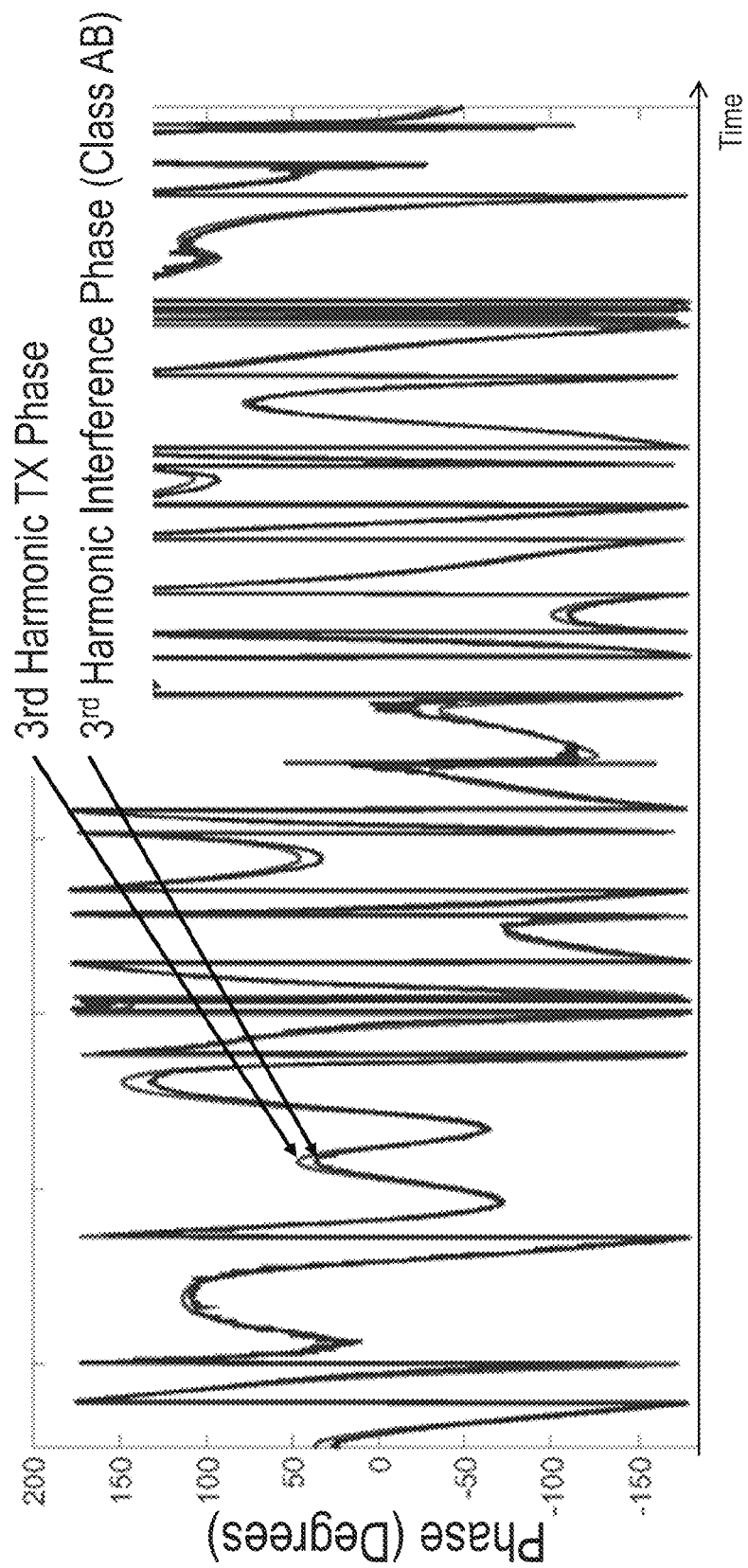
FIG. 10 is a graph illustrating, over time, exemplary 3rd harmonic interference phase and 3rd harmonic TX phase corresponding to an embodiment transmit path that uses a class AB Power Amplifier (PA)

FIG. 10 is a graph illustrating, over time, the difference between the 3rd harmonic interference phase and the 3rd harmonic TX phase, for an embodiment of transmit path 102 of FIG. 1 that implements PA 106 using a class AB amplifier (i.e., a class AB transmit path). Since these two phases vary in synchronicity with each other, a relationship between their difference and the TX baseband envelope can be mapped. The 3rd harmonic TX phase is used instead of the TX input phase because the 3rd harmonic interference phase varies at the same speed as the former but at three times the speed of the latter.

The phase of the 3rd harmonic TX phase $\angle\phi_3$ is equivalent to three times the fundamental TX baseband phase ($3\times\angle\phi_{TXBB}$). More generally, the phase $\angle\phi_k$ of the kth harmonic of the complex TX baseband input is equivalent to the phase of the complex TX baseband input raised to the kth power, which is equivalent to k times the TX baseband phase ($k\times(\angle\phi_{TXBB})$). Thus, the envelope-to-phase mapping used by, for example, LUT 904 of FIG. 9, maps the envelope of the TX baseband to the phase shift $\Delta\phi_k$, which is equal to the difference between the kth harmonic interference phase and the kth multiple of the TX baseband phase ($\Delta\phi_k$=(kth harmonic interference phase−$[k\times(\angle\phi_{TXBB})]$).

Figure 11:
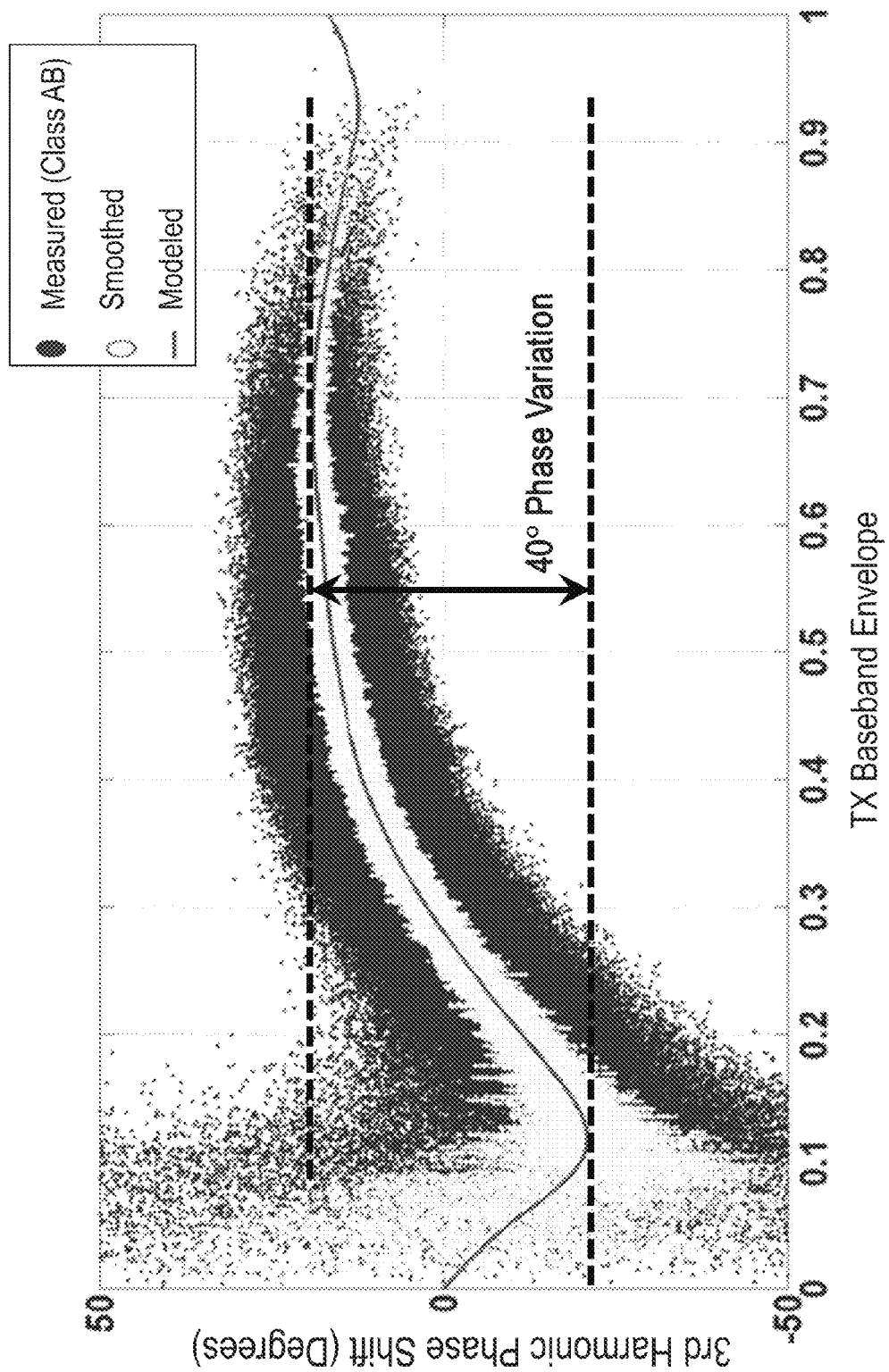
FIG. 11 is a graph illustrating an exemplary relationship between the 3rd harmonic phase shift and the TX baseband envelope corresponding to an embodiment transmit path that uses a class AB PA.

FIG. 11 is a graph illustrating, for an embodiment class AB transmit path, the relationship between the 3rd harmonic phase shift and the TX baseband envelope, which is referred to in this disclosure as the "AMPM" relationship. The outer darker dots in FIG. 11 are the measured 3rd harmonic phase shift. The inner lighter dots are a smoothing version of the measured 3rd harmonic phase shift. Piecewise smooth spline interpolation is used to find an embodiment 3rd harmonic phase shift model, indicated by the solid line in FIG. 11. In other embodiments, other interpolation techniques may be used to find the kth harmonic phase shift model.

In some embodiments, this class AB phase shift model of FIG. 11 is used to map the AMPM relationship for interference reduction. For example, when used for real-time 3rd harmonic reduction, an embodiment of LUT 904 (shown in FIG. 9) may store values that are determined in accordance with the AMPM relationship mapped by the phase shift model of FIG. 11. Embodiment reduction systems using such an LUT 904 may be able to effectively reduce the highly non-linear interference caused by a class AB amplifier. More generally, in various embodiments a kth harmonic phase shift model generated by AMPM piecewise smooth spline interpolation, or another suitable interpolation technique, may be used to effectively reduce such highly non-linear interference caused by a class AB amplifier, and may be, for example, stored in an LUT. By comparison, the complex polynomial technique of FIGS. 6-8 does not converge for such highly non-linear interference, and thus reduction systems that use this technique are unable to effectively reduce interference caused by a class AB amplifier in the transmit path.

Figure 12:
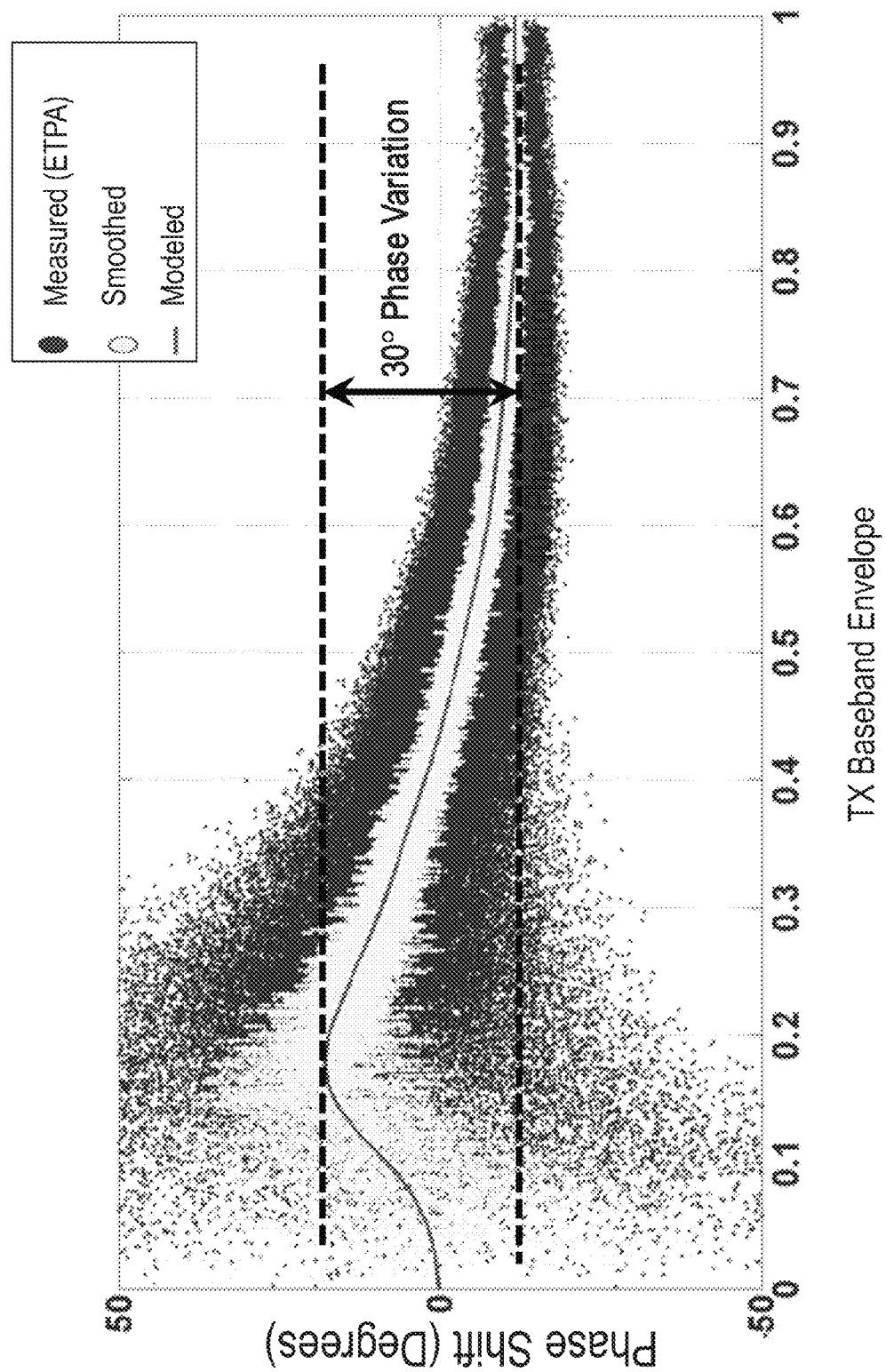
FIG. 12 is a graph illustrating an exemplary relationship between the 3rd harmonic phase shift and the TX baseband envelope corresponding to an embodiment transmit path that uses an envelope tracking PA (ETPA)

FIG. 12 is a graph illustrating the AMPM relationship for an embodiment of transmit path 102 of FIG. 1 that implements PA 106 using an ETPA (i.e., an ETPA transmit path). The outer darker dots in FIG. 12 are the measured 3rd harmonic phase shift. The inner lighter dots are a smoothing version of the measured 3rd harmonic phase shift. Piecewise smooth spline interpolation is used to find an embodiment 3rd harmonic phase shift model, indicated by the solid line in FIG. 12. In other embodiments, other interpolation techniques may be used to find the kth harmonic phase shift model.

In some embodiments, this ETPA phase shift model of FIG. 12 is used to map the AMPM relationship for interference reduction. For example, when used for real-time 3rd harmonic reduction, an embodiment of LUT 904 (shown in FIG. 9) may store values that are determined in accordance with the AMPM relationship mapped by the phase shift model of FIG. 12. Embodiment reduction systems using such an LUT 904 may be able to effectively reduce the interference generated by an ETPA transmit path. More generally, in various embodiments a kth harmonic phase shift model generated by AMPM piecewise smooth spline interpolation, or another suitable interpolation technique, may be used to effectively reduce such interference and may be, for example, stored in an LUT.

Figure 13:
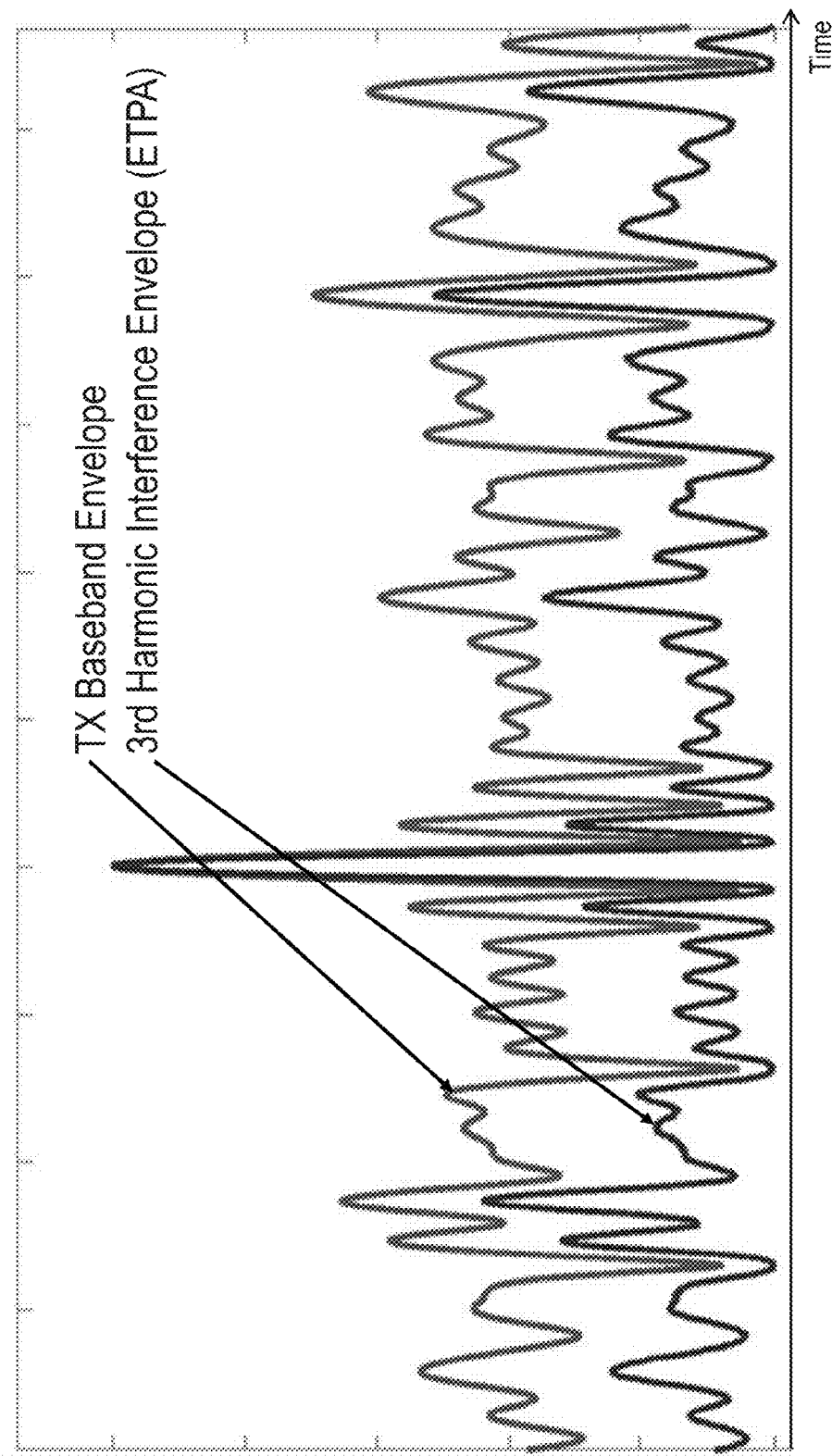
FIG. 13 is a graph illustrating an exemplary 3rd harmonic interference envelope over time and an exemplary TX baseband envelope over time corresponding to an embodiment transmit path that uses an ETPA.

FIG. 13 is a graph illustrating, for an embodiment ETPA transmit path over time, the 3rd harmonic interference envelope over time and the TX baseband envelope over time. The relationship between these two envelopes is referred to in this disclosure as the "AMAM" relationship. This AMAM relationship demonstrates a nonlinearity between the baseband TX envelope and the 3rd harmonic envelope. In some embodiments, modeling of this nonlinear AMAM relationship is accomplished in an LUT using a piecewise linear function. For example, an embodiment of LUT 906 (shown in FIG. 9) may implement a mapping of the kth harmonic AMAM relationship. Although the magnitudes of the baseband TX envelope and the 3rd harmonic interference envelope are a function of TX power, the 3rd harmonic AMAM mapping remains the same with different TX power.

Figure 14:
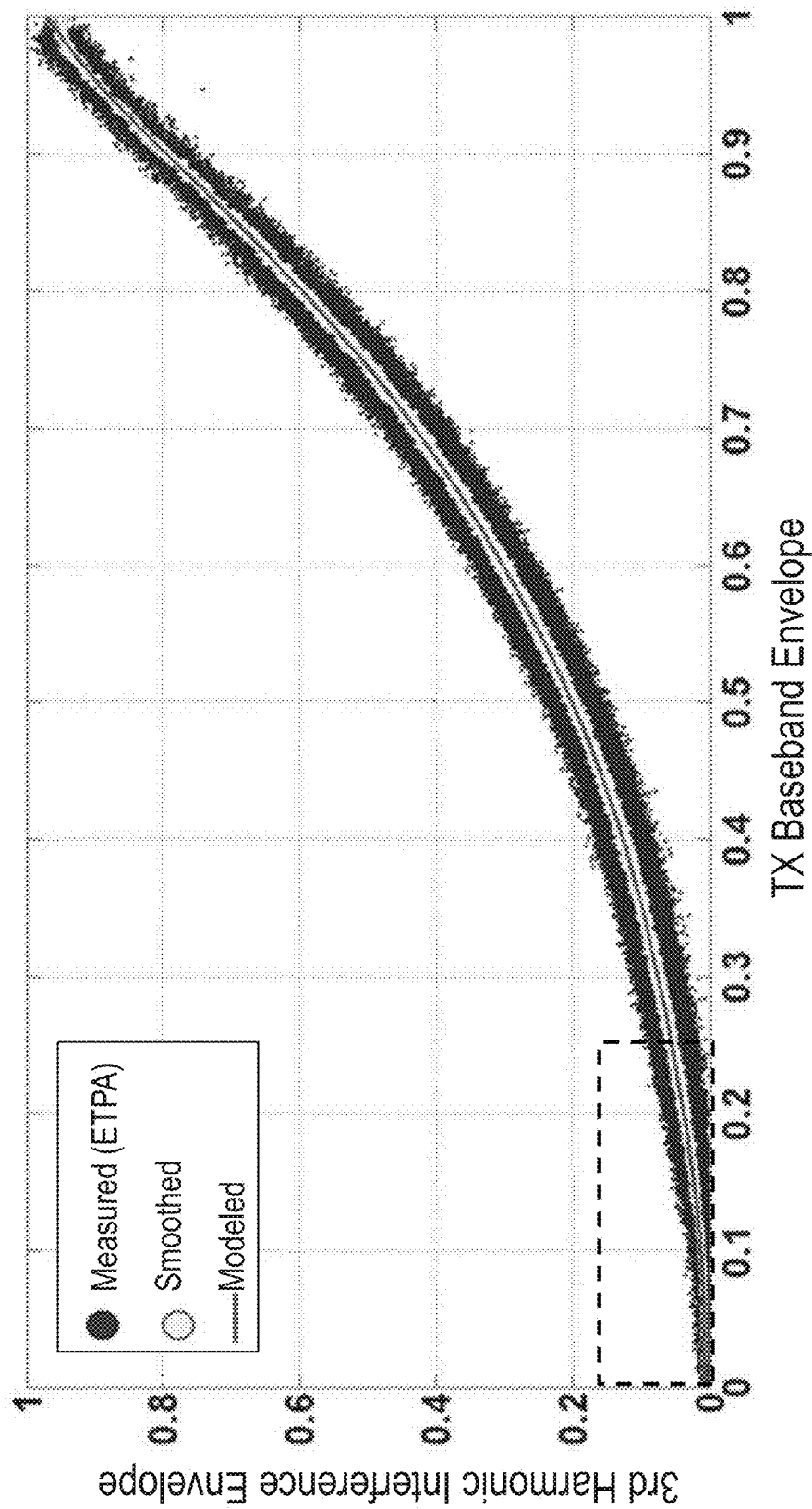
FIG. 14 is a graph illustrating an exemplary relationship between the 3rd harmonic interference envelope and the TX baseband envelope corresponding to an embodiment transmit path that uses an ETPA.

FIG. 14 is a graph illustrating the 3rd harmonic AMAM relationship for an embodiment ETPA transmit path. The outer darker dots in FIG. 14 are the measured 3rd harmonic interference envelope. The inner lighter dots are a smoothing version of the measured 3rd harmonic interference envelope. Piecewise smooth spline interpolation is used to find an embodiment 3rd harmonic interference envelope model, indicated by the solid line in FIG. 14. In other embodiments, other interpolation techniques may be used to find the kth harmonic interference envelope model.

Figure 15:
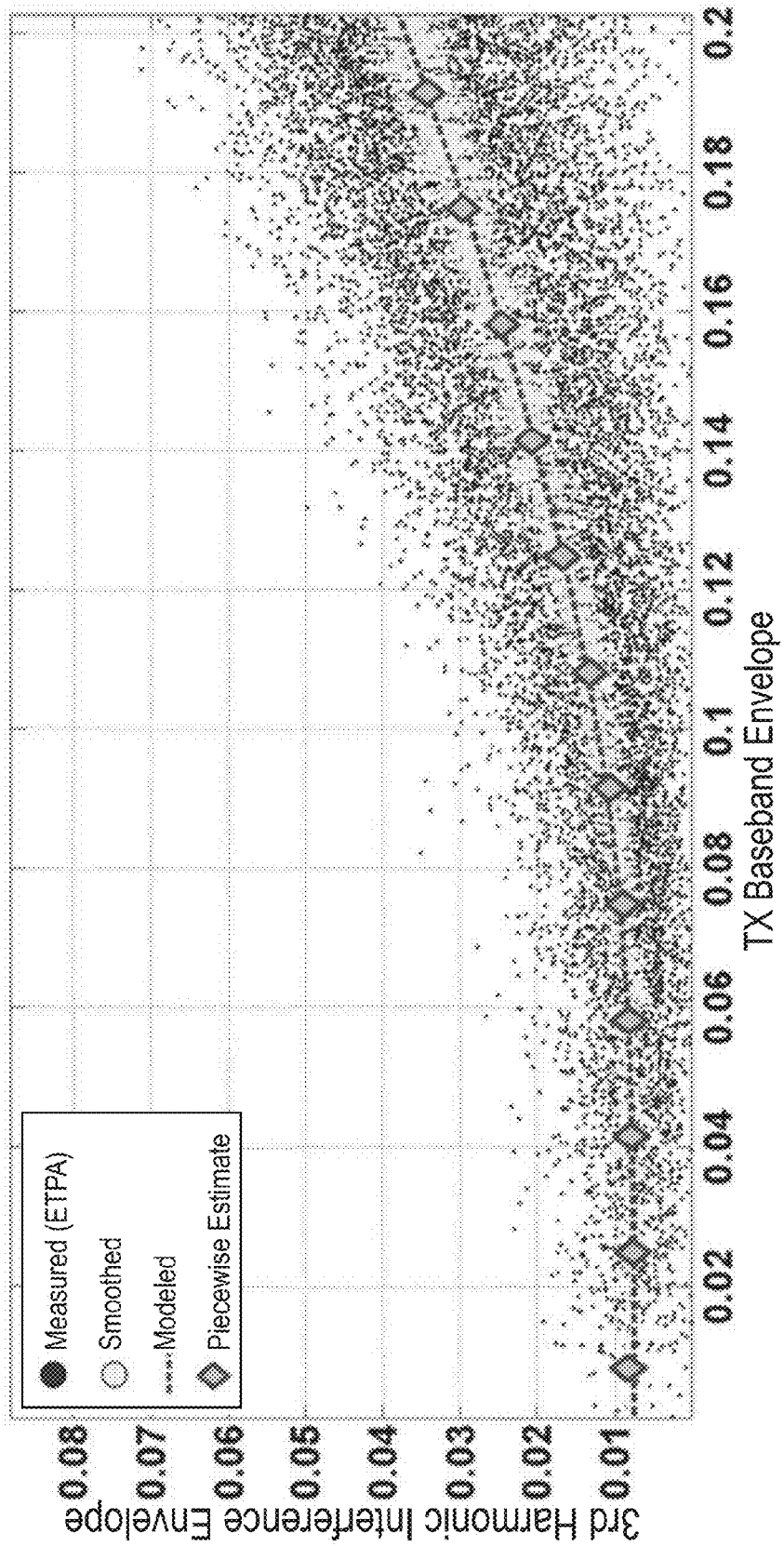
FIG. 15 is a graph illustrating a magnified view of a portion of FIG. 14.

FIG. 15 illustrates a magnified view of the portion of FIG. 14 within the dashed rectangle. The outer darker dots of FIG. 15 represent the measured data. The inner lighter dots are the smoothing measured data to reduce the outlier effect. The diamond markers are the piecewise nonlinearity estimate. The embodiment 3rd harmonic envelope model, indicated by the dashed line, results from piecewise smooth spline interpolation of the curve formed by the diamond markers.

In some embodiments, the ETPA interference envelope model of FIGS. 14-15 is used to map the AMAM relationship for interference reduction. For example, when used for real-time 3rd harmonic reduction, an embodiment of LUT 906 (shown in FIG. 9) may store values that are determined in accordance with the AMAM relationship mapped by the ETPA interference envelope model of FIGS. 14-15. Embodiment reduction systems using such an LUT may be able to effectively reduce the interference generated by an ETPA transmit path. More generally, in various embodiments a kth harmonic interference envelope model generated by AMAM piecewise smooth spline interpolation, or another suitable interpolation technique, may be used to effectively reduce such interference and may be, for example, stored in an LUT.

Figure 16:
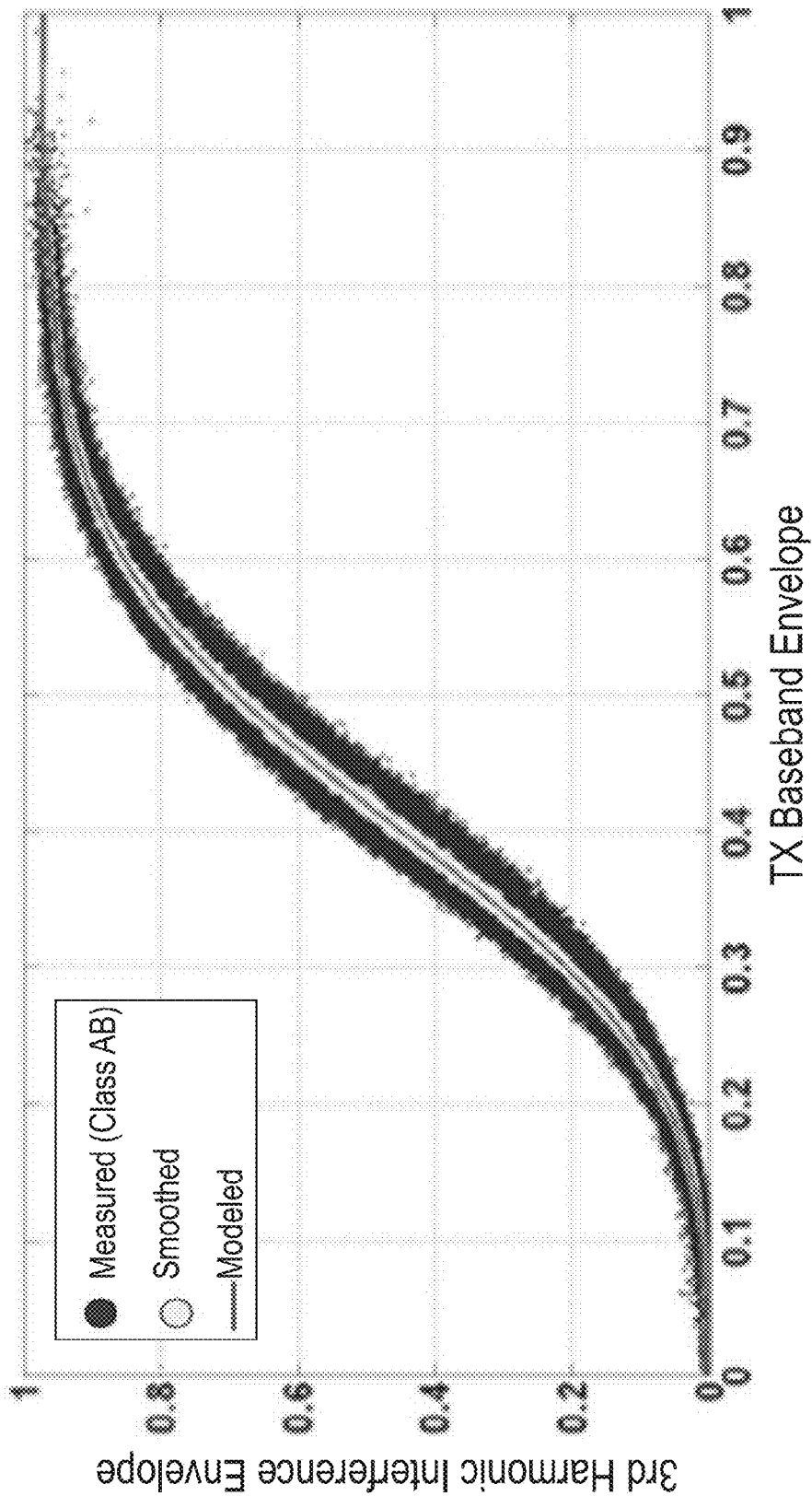
FIG. 16 is a graph illustrating an exemplary relationship between the 3rd harmonic interference envelope and the TX baseband envelope corresponding to an embodiment transmit path that uses a class AB PA.

FIG. 16 is a graph illustrating the 3rd harmonic AMAM relationship for an embodiment class AB transmit path. The outer darker dots in FIG. 16 are the measured 3rd harmonic interference envelope. The inner lighter dots are a smoothing version of the measured 3rd harmonic interference envelope. Piecewise smooth spline interpolation is used to find an embodiment 3rd harmonic interference envelope model, indicated by the solid line in FIG. 16. In other embodiments, other interpolation techniques may be used to find the kth harmonic interference envelope model.

In some embodiments, this class AB interference envelope model of FIG. 16 is used to map the AMAM relationship for interference reduction. For example, when used for real-time 3rd harmonic reduction, an embodiment of LUT 906 (shown in FIG. 9) may store values that are determined in accordance with the AMAM relationship mapped by the TX envelope model of FIG. 16. Embodiment reduction systems using such an LUT 906 may be able to effectively reduce the highly non-linear interference caused by a class AB amplifier. More generally, in various embodiments a kth harmonic interference envelope model generated by AMAM piecewise smooth spline interpolation, or another suitable interpolation technique, may be used to effectively reduce such highly non-linear interference caused by a class AB amplifier, and may be, for example, stored in an LUT.

Figure 17:
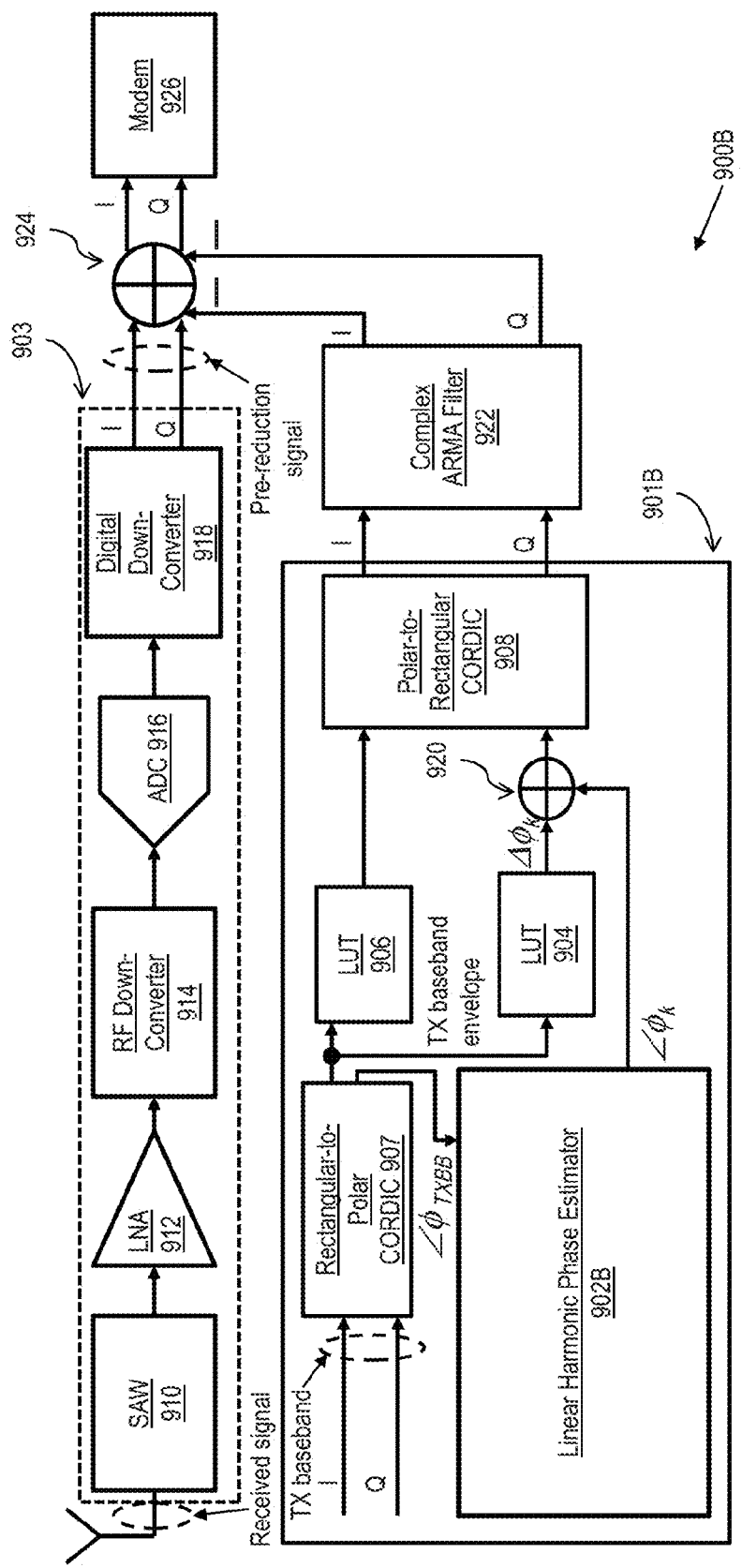
FIG. 17 is a block diagram illustrating an alternative embodiment of an envelope/phase mapping interference reduction system.

FIG. 17 illustrates an embodiment interference reduction system 900B, which is an alternative to the embodiment reduction system 900A of FIG. 9. System 900B may be implemented using programming and/or instructions for execution by one or more processor(s) (e.g., processor 604 of FIG. 29), and/or other IC chip(s), including, e.g., a general purpose processor/microprocessor, a DSP, an ASIC, an FPGA or another programmable logical device, a discrete gate or a transistor logical device, or a discrete hardware component.

In various embodiments, relative to the complex polynomial techniques of FIGS. 6-8, performing DPD and harmonic interference reduction using envelope/phase mapping systems such as system 900A or system 900B avoids the requirement for appropriate kernel selection and may exhibit lower power consumption, less computational complexity, lower cost (better silicon area efficiency), and better reduction performance. System 900B is different from system 900A in that it includes an alternative interference modeling stage 901B having an alternative linear harmonic phase estimator 902B. Phase estimator 902B does not receive the I and Q components of the TX baseband signal, but instead receives the TX baseband phase $\angle \phi_{TXBB}$ that results after these I and Q components have been converted from rectangular to polar form by CORDIC 907.

Figure 18A:
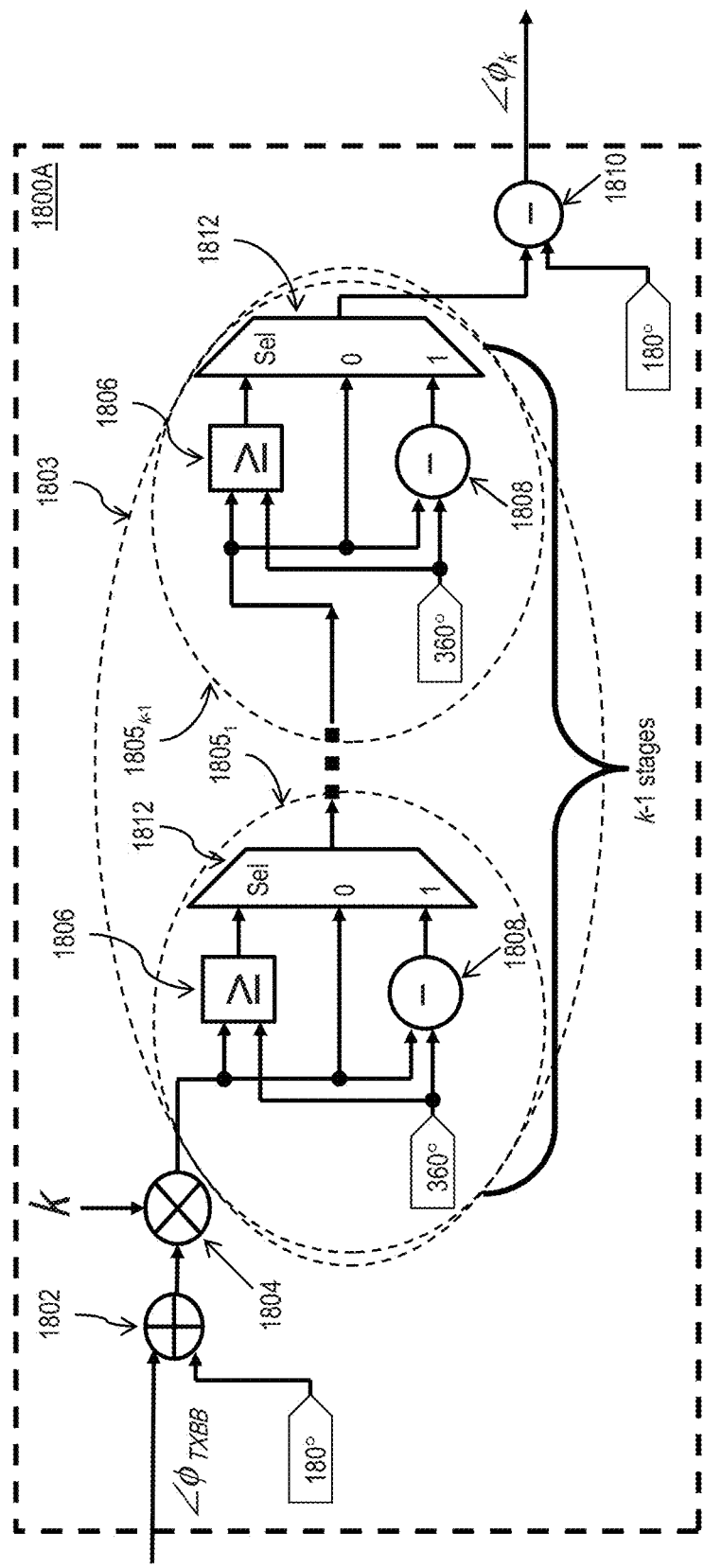
FIG. 18A is a block diagram illustrating an embodiment kth harmonic phase estimator having zero multiplication operations.

FIG. 18A illustrates an embodiment kth harmonic phase estimator 1800A that has zero-M multiplications. Phase estimator 1800A may be used as the linear harmonic phase estimator 902B of FIG. 17, resulting in a low total of only 2M multiplications by the interference modeling stage 901B of FIG. 17. Phase estimator 1800A includes adder 1802, multiplier 1804, subtractor 1810, and a phase adjustment chain 1803. The phase adjustment chain 1803 includes a number k-1 of identical serially-connected phase adjustment stages $1805_1$ to $1805_{k-1}$, each of which includes a comparator 1806, a subtractor 1808, and a switch 1812.

Phase estimator 1800A takes into account that phase is defined in the range [0°, 360°) by performing any necessary phase range adjustments to prevent phase distortion. The phase estimator 902B receives the TX baseband phase $\phi\phi_{TXBB}$, and adder 1802 adds 180° to this phase $\angle\phi_{TXBB}$. The output phase of adder 1802 is then provided to multiplier 1804, which multiplies the phase by the harmonic order k.

The output of multiplier 1804 is then provided as an input to phase adjustment stage $1805_1$, which adjusts the phase as necessary and provides its output as an input to the next phase adjustment stage in the chain 1803, which adjusts the phase as necessary and provides its output as an input to the next phase adjustment stage in the chain 1803, and so on, until the phase is adjusted as necessary and output from the last phase adjustment stage $1805_{k-1}$ of the chain 1803. In each of phase adjustment stages $1805_1$ to $1805_{k-1}$, the input to the phase adjustment stage is provided to comparator 1806, subtractor 1808, and switch 1812. The subtractor 1808 subtracts 180° from this input to provide a reduced phase. The switch 1812 receives a selection control signal from comparator 1806, which compares the phase adjustment stage's input signal with 360°. If the phase adjustment stage's input signal is less than 360°, the switch 1812 simply passes this input signal through as the output of the respective phase adjustment stage.

After the phase has been adjusted as necessary by the chain 1803, the subtractor 1810 receives the output from the phase adjustment chain 1803. The subtractor 1810 subtracts 180° from this phase chain output to provide the kth harmonic TX phase estimate $\angle \phi_k$ as the output of phase estimator 902B.

Figure 18B:
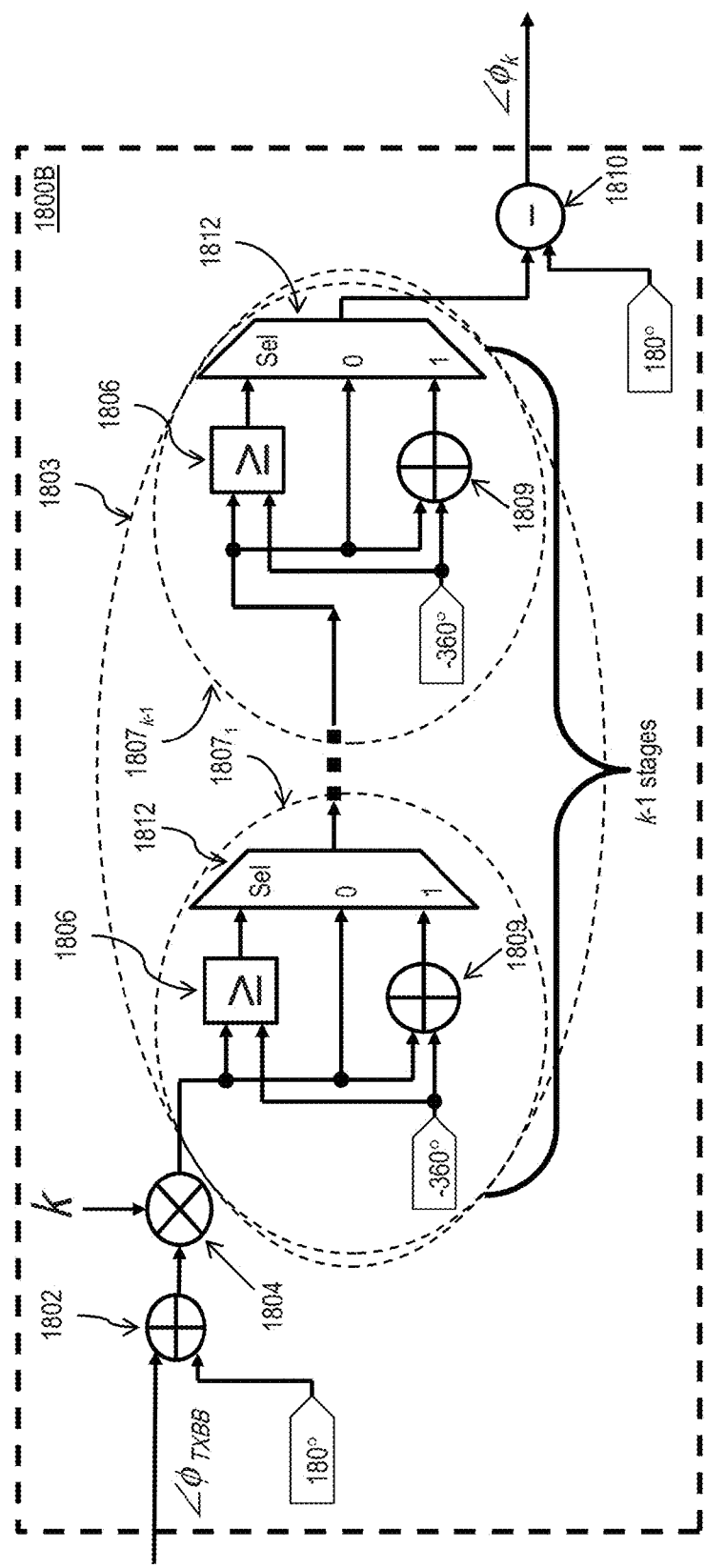
FIG. 18B is a block diagram illustrating an alternative embodiment kth harmonic phase estimator having zero multiplication operations.

FIG. 18B illustrates an alternative embodiment kth harmonic phase estimator 1800B that has zero-M multiplications. Phase estimator 1800B replaces the phase adjustment stages $1805_1$ to $1805_{k-1}$ of FIG. 18A with phase adjustment stages $1807_1$ to $1807_{k-1}$. Phase adjustment stages $1807_1$ to $1807_{k-1}$ only differ from phase adjustment stages $1805_1$ to $1805_{k-1}$ in that they replace subtractor 1808 with adder 1809, which adds −360° instead of subtracting 360°.

Figure 19:
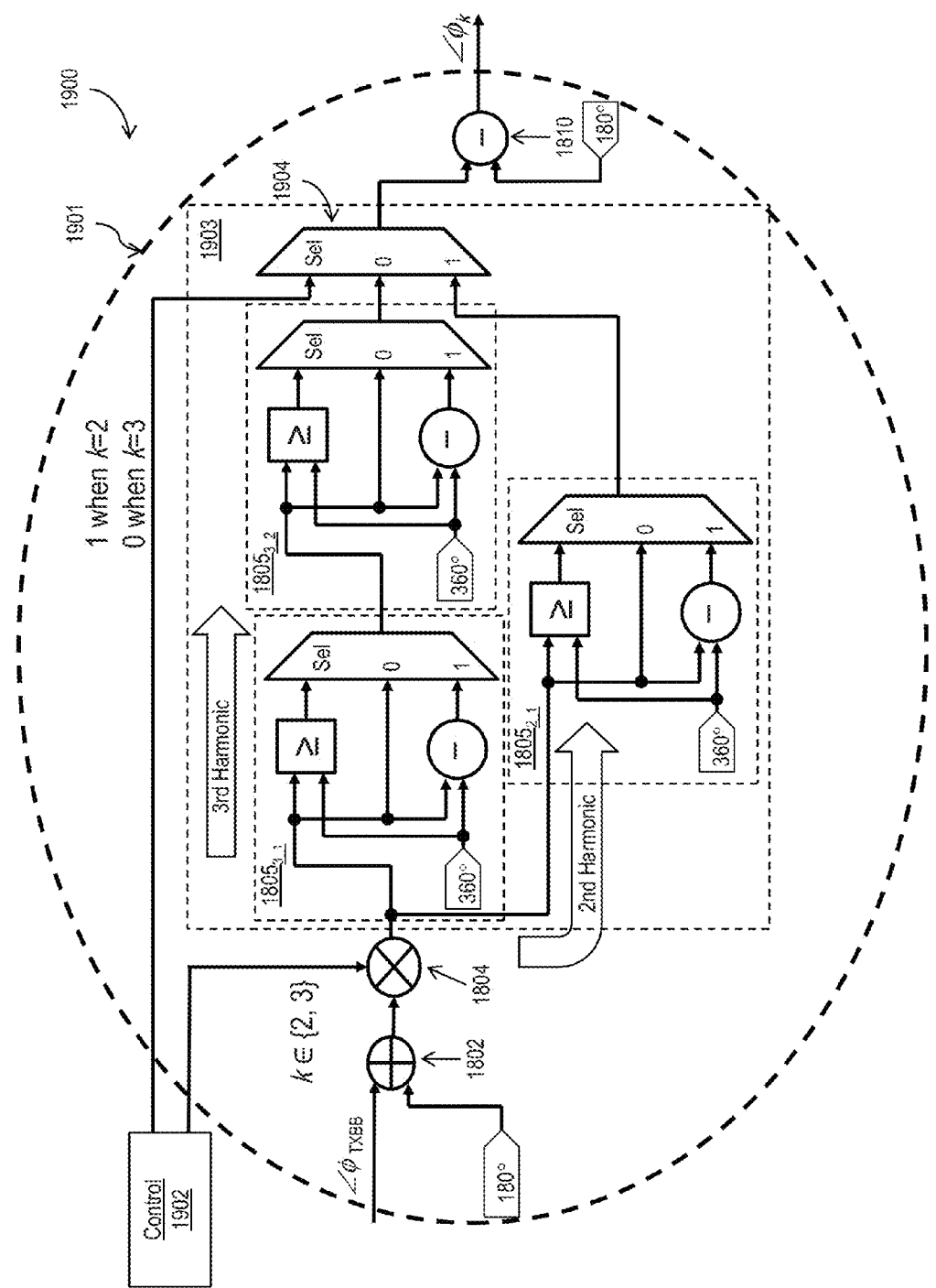
FIG. 19 is a block diagram illustrating an embodiment 2nd and 3rd harmonic phase estimation system.

FIG. 19 illustrates an embodiment 2nd and 3rd harmonic phase estimation system 1900 that may be used as the linear harmonic phase estimator 902B of FIG. 17. System 1900 includes phase estimator 1901, which is capable of determining either a 2nd or 3rd harmonic TX phase estimate using zero complex multiplications. The 2nd harmonic TX phase estimate may be used to reduce interference due to, e.g., Band 3 and Band 8 carrier aggregation, while the 3rd harmonic TX phase estimate may be used to reduce interference due to, e.g., Band 4 RX and Band 17 TX carrier aggregation. Phase estimator 1901 is the same as phase estimator 1800A of FIG. 18A expect that it replaces phase adjustment chain 1803 with phase adjustment block 1903.

Phase adjustment block 1903 includes phase adjustment stages $1805_{3\_1}$, $1805_{3\_2}$, and $1805_{2\_1}$, each of which is identical to phase adjustment stage $1805_1$ of FIG. 18A. In an alternative embodiment, each of phase adjustment stages $1805_{3\_1}$, $1805_{3\_2}$, and $1805_{2\_1}$ is identical to phase adjustment stage $1807_1$ of FIG. 18B.

Referring again to FIG. 19, the output of multiplier 1804 is provided to a 3rd harmonic branch of phase adjustment block 1903, which is made up of stages $1805_{3\_1}$ and $1805_{3\_2}$ connected in series. The output of multiplier 1804 is also provided to phase adjustment stage $1805_{2\_1}$, which constitutes a 2nd harmonic branch of block 1903.

Phase adjustment block 1903 also includes switch 1904 that provides its output to subtractor 1810. Switch 1904 switches its output between the output of phase adjustment stage $1805_{3\_2}$ and the output of phase adjustment stage $1805_{2\_1}$, depending on the value of a select signal provided by a control stage 1902 of system 1900. This control stage 1902 also selects a value of either k=2 or k=3 as the harmonic order and provides this value to multiplier 1804. This harmonic order is the multiple by which the TX baseband phase $\angle \phi_{TXBB}$ is multiplied in system 1900.

Figure 20:
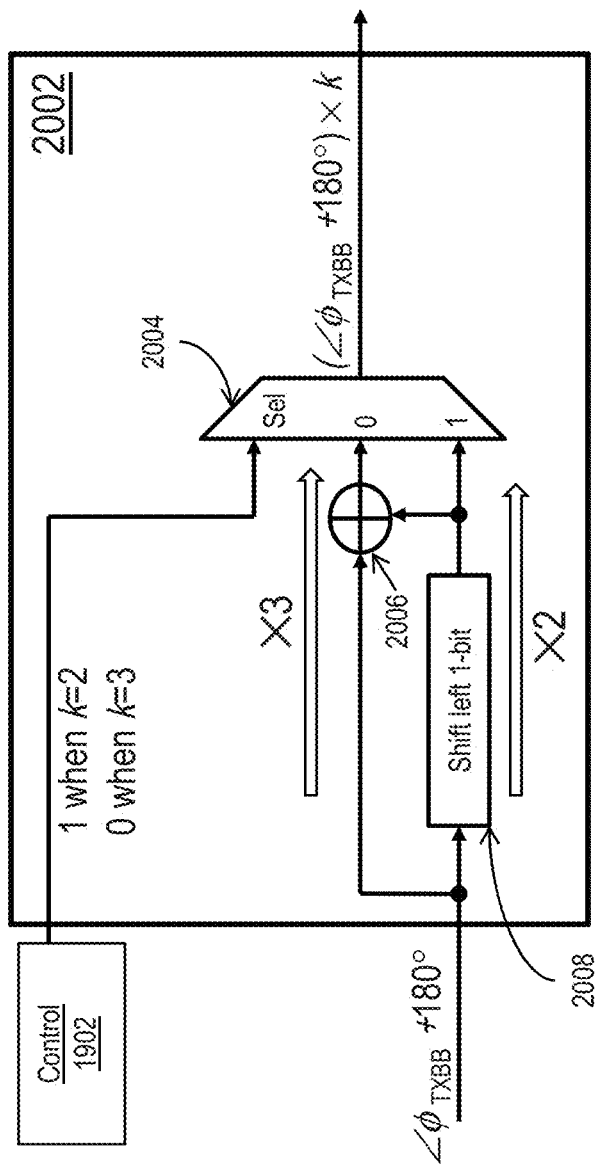
FIG. 20 is a block diagram illustrating an embodiment adder-shifter stage that may be used to implement a multiplication stage using zero multiplication operations.

FIG. 20 illustrates an embodiment combined adder-shifter 2002 that may be used to implement the multiplier 1804 of FIGS. 18A-18B and 19 without any multiplication operations. If the linear harmonic phase estimator 902B of FIG. 17 is implemented using the phase estimation system 1900 of FIG. 19 and the adder-shifter 2002 of FIG. 20, zero complex multiplications are required to provide the 2nd or 3rd harmonic TX phase estimate, resulting in a low total of only 2M multiplications by the interference modeling stage 901B of FIG. 17.

Referring again to FIG. 20, adder-shifter 2002 includes a 2nd harmonic path that includes a shift register 2008 and a 3rd harmonic path that includes both this shift register 2008 and an adder 2006. The 180° adjusted TX baseband phase ($\angle \phi_{TXBB}$+180°) is provided to shift register 2008 and to adder 2006. The shift register 2008 shifts the 180° adjusted TX baseband phase by one bit to the left, which is equivalent to doubling this phase. The doubled phase output of shift register 2008 is provided both to adder 2006 and as a first input signal of a switch 2004 included in the adder-shifter 2002. The adder 2006 adds the 180° adjusted TX baseband phase to its doubled phase to generate a tripled phase output that is provided as a second input signal to switch 2004. Controller 1902 provides a select signal to switch 2004 that causes switch 2004 to output either the doubled phase signal for a harmonic order of k=2, or the tripled phase signal for a harmonic order of k=3.

Figure 21:
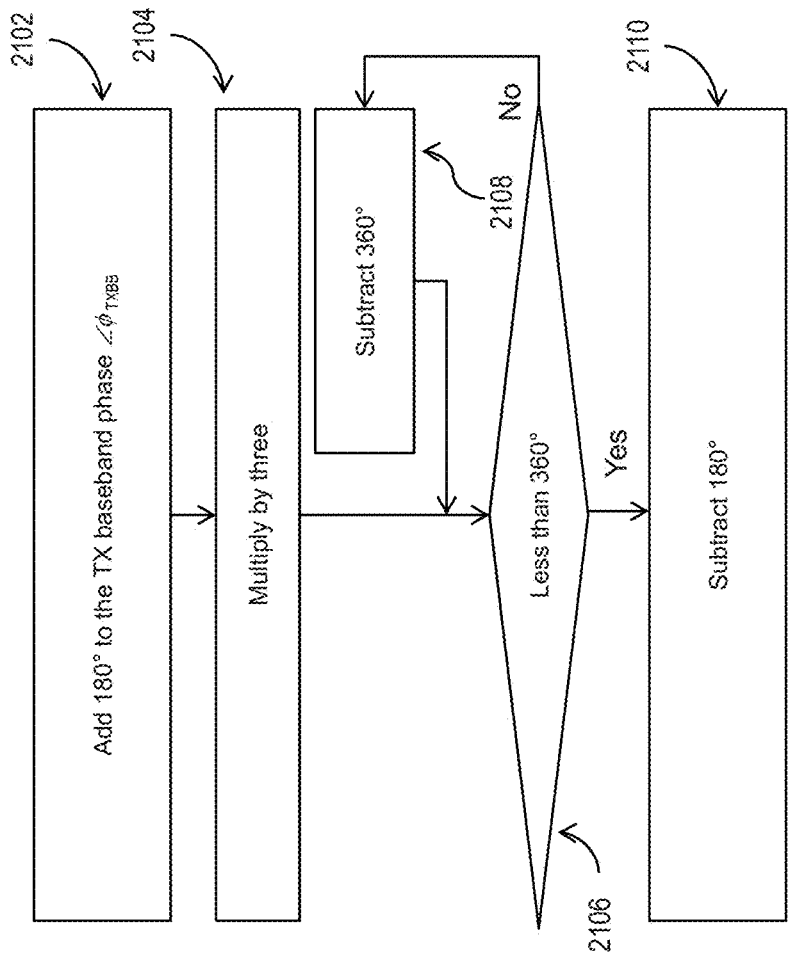
FIG. 21 is a flow chart illustrating an embodiment method for implementing a 3rd harmonic phase estimator without any multiplication operations.

FIG. 21 is a flow chart illustrating an embodiment method for implementing the linear harmonic phase estimator 902B as a 3rd harmonic phase estimator without any multiplication operations. At step 2102, 180° is added to the TX baseband phase $\angle \phi_{TXBB}$. At step 2104, the 180° adjusted TX baseband phase is tripled to obtain an unadjusted phase estimate, and then flow continues at step 2106. The tripling of the phase is performed by left-shifting the phase's initial value once and then adding this initial value once. In various embodiments, multiplying a phase by k may be accomplished by left-shifting the phase's initial value [$\log_2 k$] times and then adding the initial value ($k-2^{\lfloor \log_2 k \rfloor}$).

Referring again to FIG. 21, at step 2106, the unadjusted phase estimate that resulted from step 2104 is compared to 360°. If the unadjusted phase estimate is less than 360°, flow continues at step 2110, but otherwise flow continues at step 2108. At step 2108, 360° is subtracted from the unadjusted phase estimate, and flow returns to step 2106. If the phase estimate resulting from step 2108 is less than 360°, at step 2110 this phase estimate is reduced by 180° to obtain the 3rd harmonic TX phase estimate $\angle \phi_3$.

Figure 22:
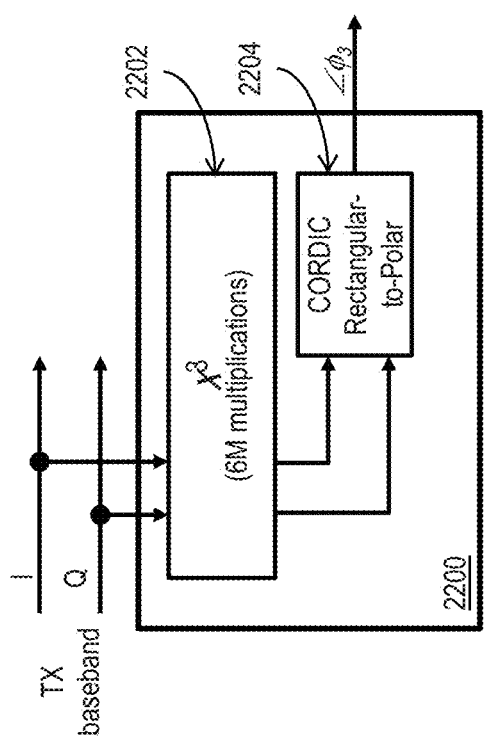
FIG. 22 is a block diagram illustrating an alternative embodiment 3rd harmonic phase estimator.

FIG. 22 illustrates an embodiment 3rd harmonic phase estimator 2200 that may be used as the linear harmonic phase estimator 902A of FIG. 9. The component I and Q of the TX baseband signal are provided to a cubing block 2202 that cubes these component signals by performing two complex multiplications, thus requiring 6M real multiplications. The cubed component signals are then converted from rectangular to polar form by CORDIC 2204 to provide a 3rd harmonic TX phase estimate $\angle \phi_3$. When phase estimator 2200 is used as the linear harmonic phase estimator 902A of FIG. 9, the interference modeling stage 901A has a total of 8M real multiplications.

Figure 23:
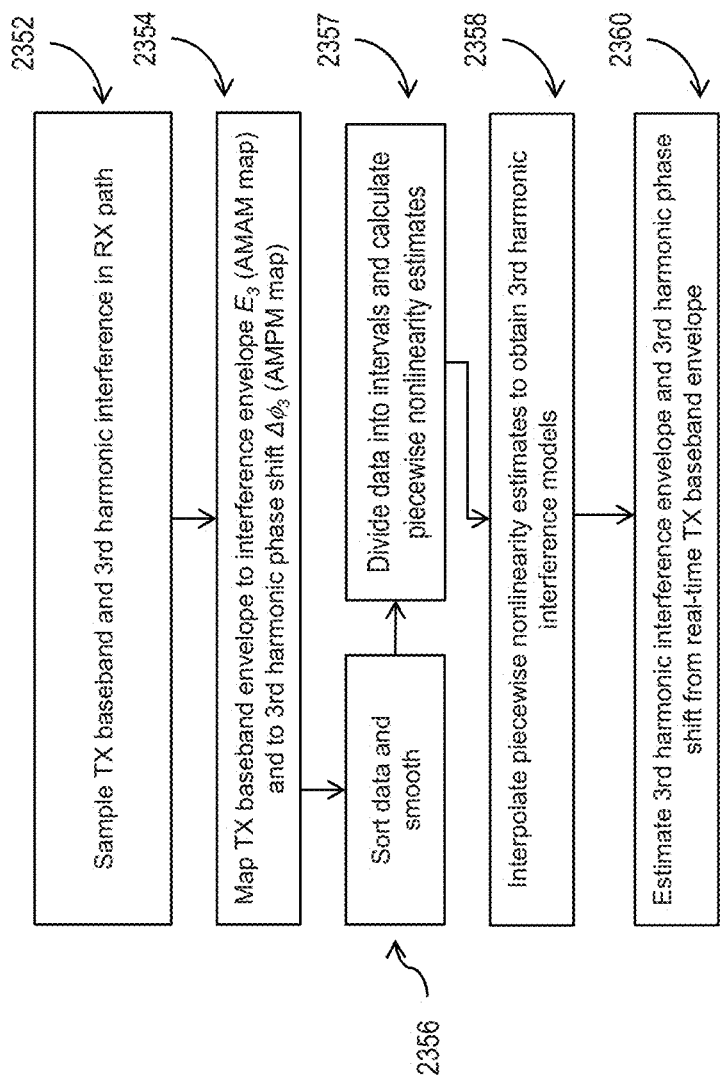
FIG. 23 is a flow chart illustrating an embodiment method for reducing 3rd harmonic interference using envelope/phase mapping.

FIG. 23 illustrates a flow chart for an embodiment method of reducing 3rd harmonic interference using an envelope/phase mapping technique. The method begins at step 2352, in which an oversampling rate greater than 4 is used to sample the TX baseband signal and to capture 3rd harmonic interference in the RX path in synchronicity with the TX baseband signal. Flow then continues at step 2354, where the 3rd harmonic interference envelope $E_3$ is mapped to the TX baseband envelope ETXBB in an AMAM relationship, and the 3rd harmonic phase shift is calculated and is mapped to the TX baseband envelope $E_{TXBB}$ in an AMPM relationship. The 3rd harmonic phase shift $\Delta \phi_3$ is calculated as $\Delta \phi_3 = [(\text{3rd harmonic interference phase}) - [3 \times (\angle \phi_{TXBB})]]$. Flow then continues at step 2356, where the interference envelope $E_3$ and interference phase shift $\Delta\phi_3$ are sorted in ascending order in accordance with the TX baseband envelope $E_{TXBB}$, and the sorted data is smoothed with a moving average filter. Flow then continues at step 2357, where for each of the AMAM data and the AMPM data, the smoothed data is equally divided into the corresponding intervals between max($E_{TXBB}$) and min($E_{TXBB}$), and a piecewise nonlinearity estimate is determined as the set of averages of the smoothed data in each interval. Flow then continues at step 2358, where smooth spline interpolation is applied to the AMAM and AMPM piecewise nonlinearity estimates to obtain the 3rd harmonic interference AMAM and AMPM models. Flow then continues at step 2360, where the 3rd harmonic interference envelope is estimated in real-time from the TX baseband envelope using the AMAM model, the 3rd harmonic phase shift is estimated in real-time from the TX baseband envelope using the AMPM model, and this interference estimate is subtracted in real time from the RX baseband signal.

Figure 24:
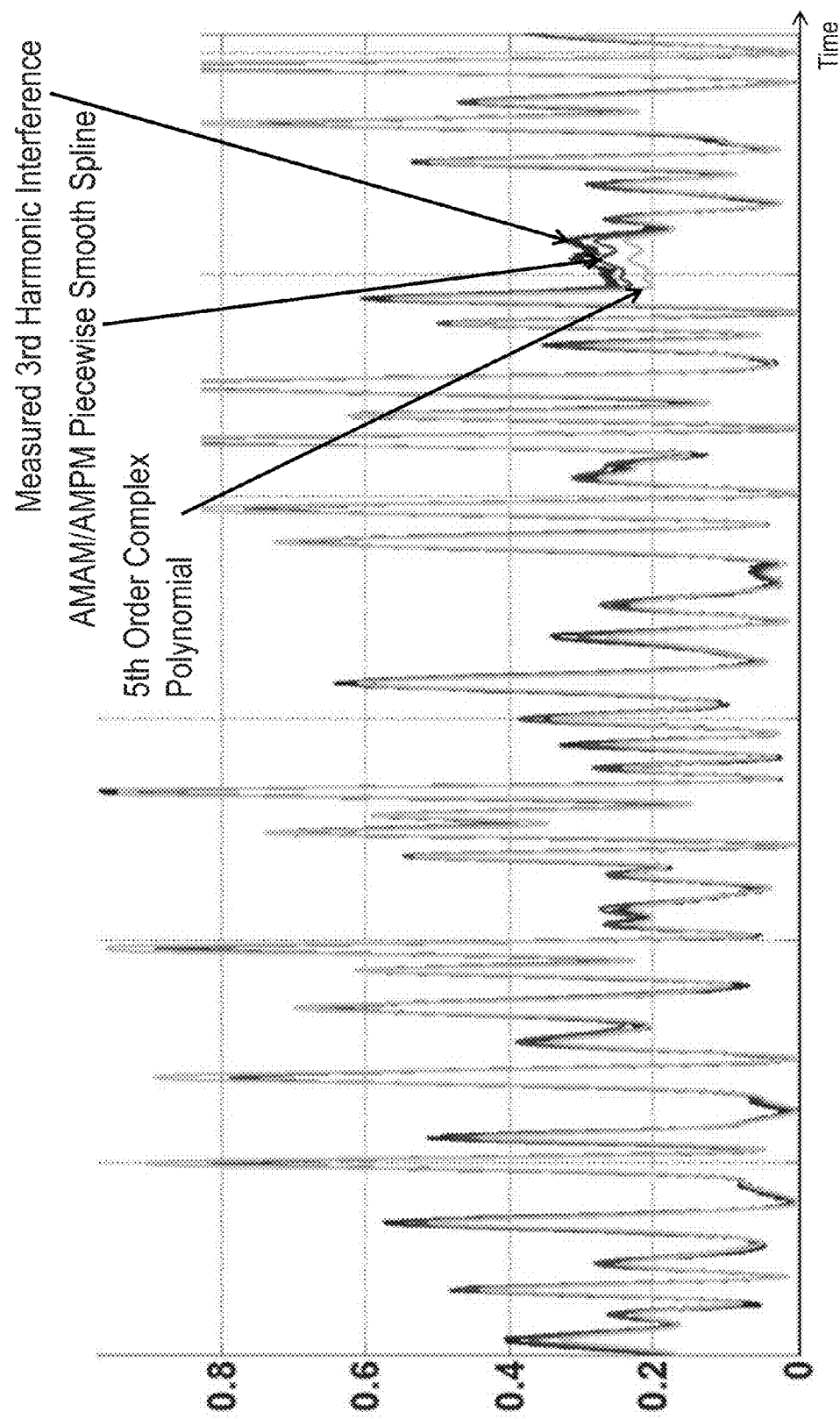
FIG. 24 is a graph illustrating, over time, exemplary 3rd harmonic interference measurements, modeled interference using an embodiment piecewise smooth spline model, and modeled interference using an exemplary 5th order complex polynomial model.

FIG. 24 is a graph illustrating, over time, the measured 3rd harmonic interference, the modeled interference using an embodiment piecewise smooth spline model with AMAM and AMPM mapping, and the modeled interference using an exemplary 5th order complex polynomial model. The same TX baseband signal was used to generate all three curves. The measured interference was measured using an ETPA transmit path.

A model fit percentage was calculated for various interference models, including the two interference models of FIG. 24, as compared to the measured 3rd harmonic interference for each of an ETPA transmit path and a class AB transmit path. The model fit percentage was calculated according to Equation 7, where y is the measured 3rd harmonic interference signal and $\hat{y}$ is the respective modeled interference signal for the same TX baseband input:

$$\text{Model fit} = 100\% \times \frac{(1 - \text{norm}(\hat{y} - y))}{\text{norm}(y - \text{mean}(y))} \quad \text{(Eq. 7)}$$

Table 1 below shows this model fit percentage for interference models that include the embodiment AMAM/AMPM piecewise smooth spline model of FIG. 2 and the exemplary 5th order complex polynomial model of FIG. 24. The model fit percentage for exemplary 3rd order, 7th order, 9th order, and nth order complex polynomial interference models is also shown, with:

TABLE 1

| | | Model Fit Percentage | |
|---|---|---|---|
| | | ETPA Model Fit | Class AB Model Fit |
| AMAM/AMPM Piecewise Smooth Spline Model | | 99.23% | 98.9% |
| Complex Polynomial Model | 3rd Order | 96.64% | Did not converge |
| | 5th Order | 98.66% | Did not converge |
| | 7th Order | 87.75% | Did not converge |
| | 9th Order | 96.82% | Did not converge |
| | 11th Order | 95.82% | Did not converge |

Figure 25:
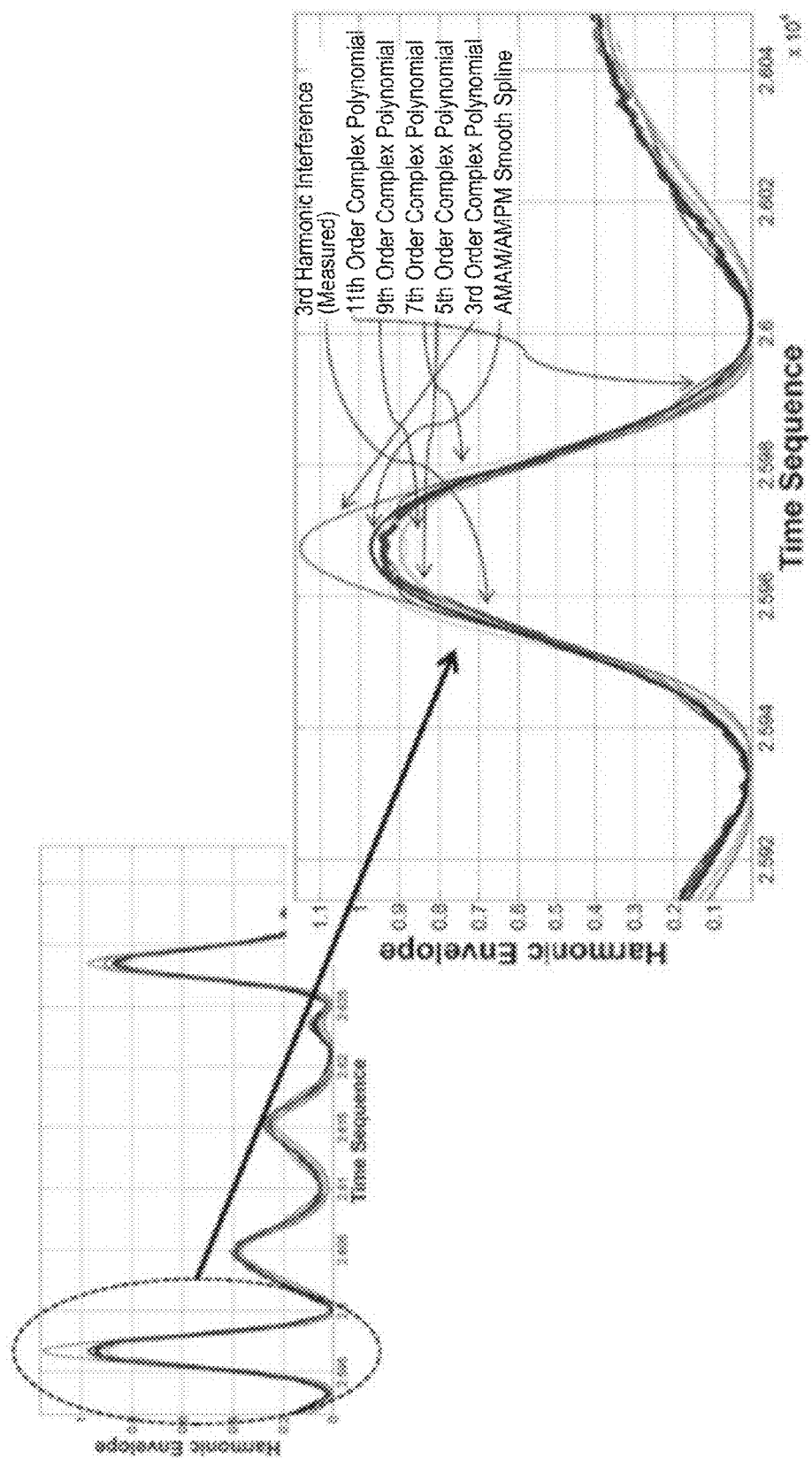
FIG. 25 is a graph illustrating, over time, the envelopes of exemplary measured 3rd harmonic interference and predicted interference for various interference models, including the embodiment piecewise smooth spline model of FIG. 24.
Figure 26:
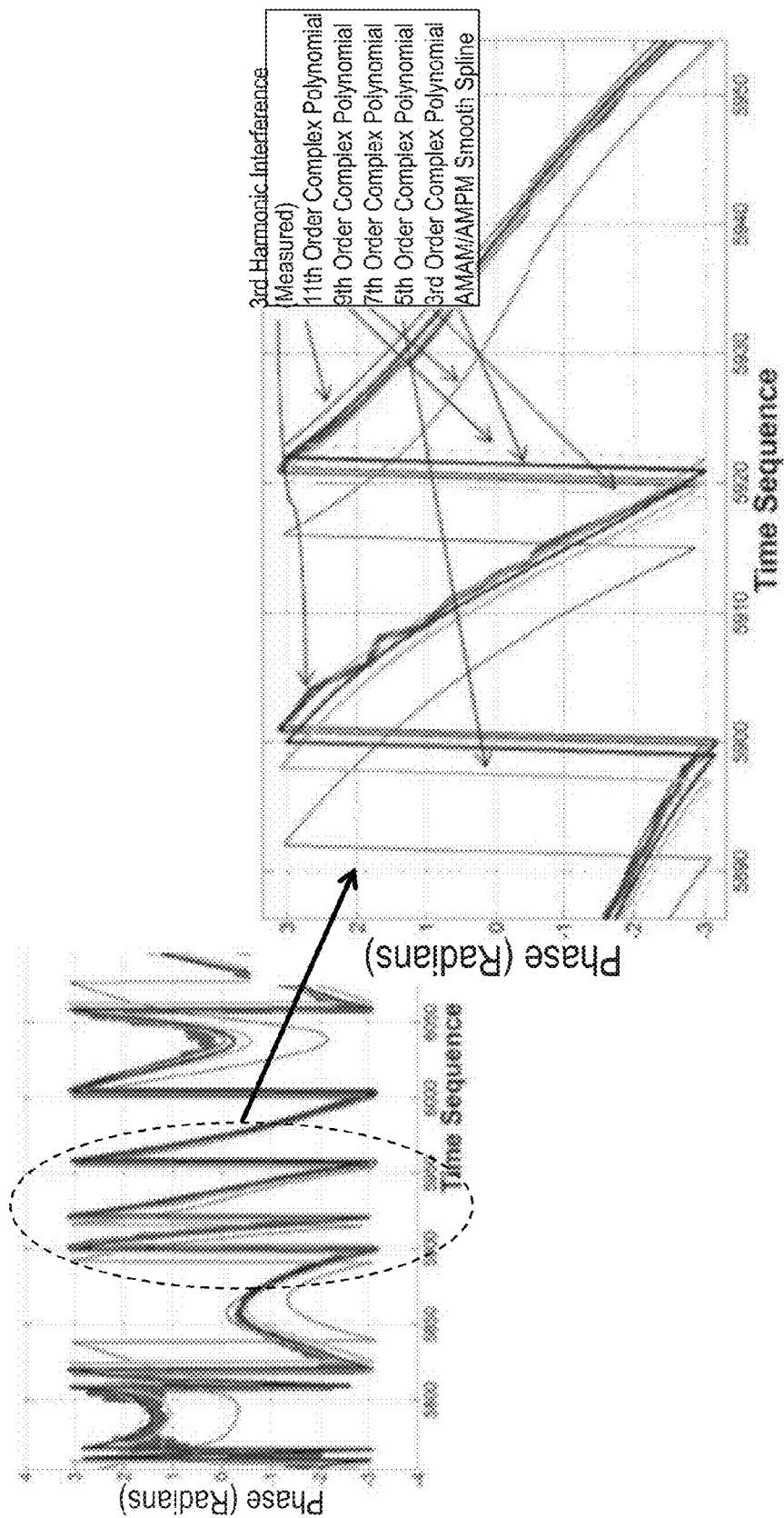
FIG. 26 is a graph illustrating, over time, the phases of the exemplary measured 3rd harmonic interference and the predicted interference for the various interference models of FIG. 25.

The embodiment AMAM/AMPM piecewise smooth spline model demonstrated the best model fit performance at 99.23% as compared to the measured 3rd harmonic interference for an ETPA transmit path. FIG. 25 is a graph illustrating the envelope of this measured 3rd harmonic interference over time and comparing that envelope to the respective envelope predicted by each of the interference models shown in Table 1. FIG. 26 is a graph illustrating the phase of this measured 3rd harmonic interference over time and comparing that phase to the respective phase predicted by each of the interference models shown in Table 1.

Figure 27:
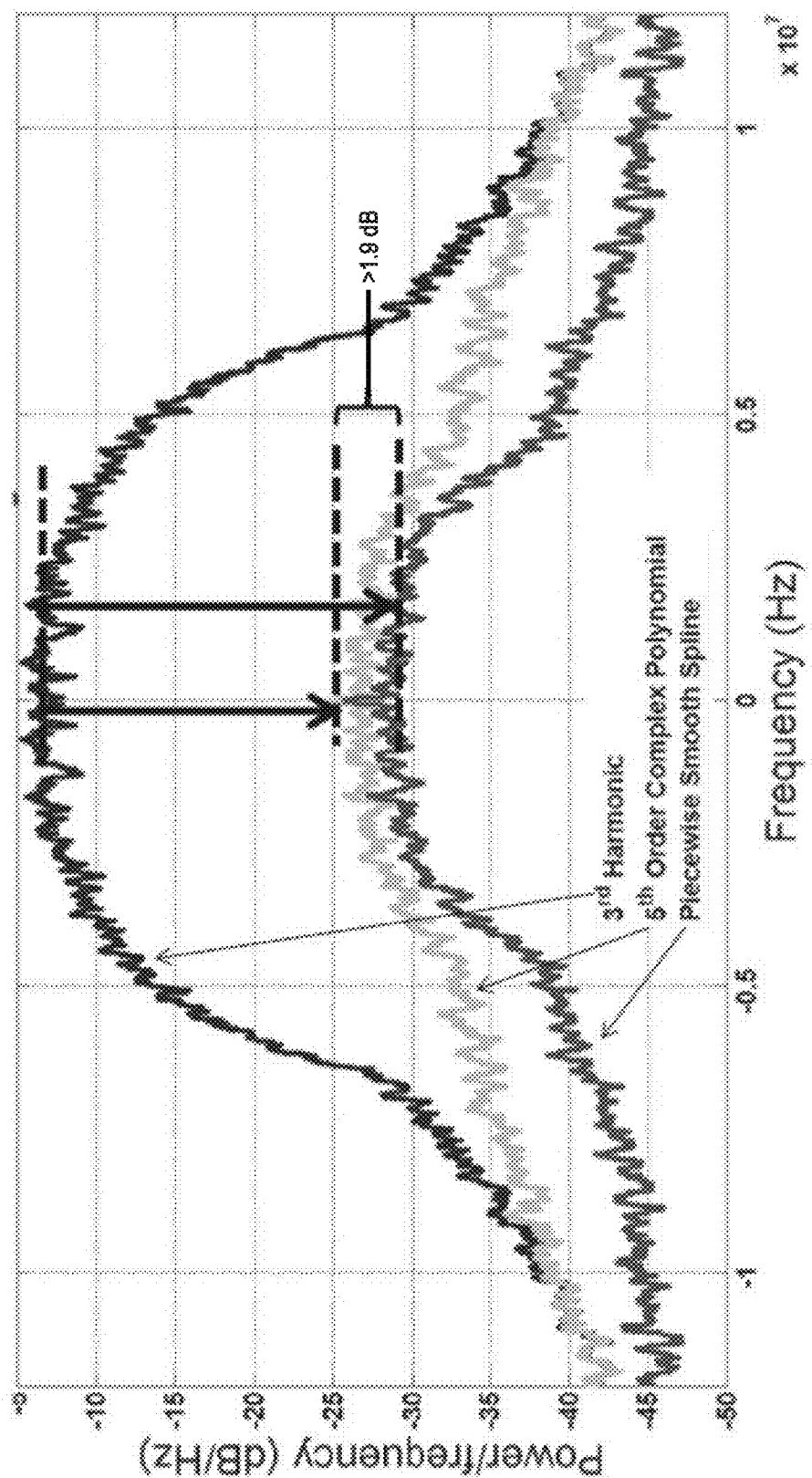
FIG. 27 is a graph illustrating normalized power curves over frequency for exemplary measured 3rd harmonic interference, modeled interference using an embodiment piecewise smooth spline model, and modeled interference using an exemplary 5th order complex polynomial model.

FIG. 27 is a graph illustrating a respective normalized power curve over frequency for each of: (1) an embodiment method that uses a continuous AMAM/AMPM map generated from a piecewise smooth spline model, (2) an exemplary method that uses a 5th order complex polynomial interference model, and (3) the measured 3rd harmonic interference generated using an ETPA transmit path. The same TX baseband signal was used to generate all three of these curves. As can be seen from FIG. 27, the embodiment AMAM/AMPM method is predicted to have an improved reduction performance of more than 1.9 dB relative to the complex polynomial method.

Figure 28:
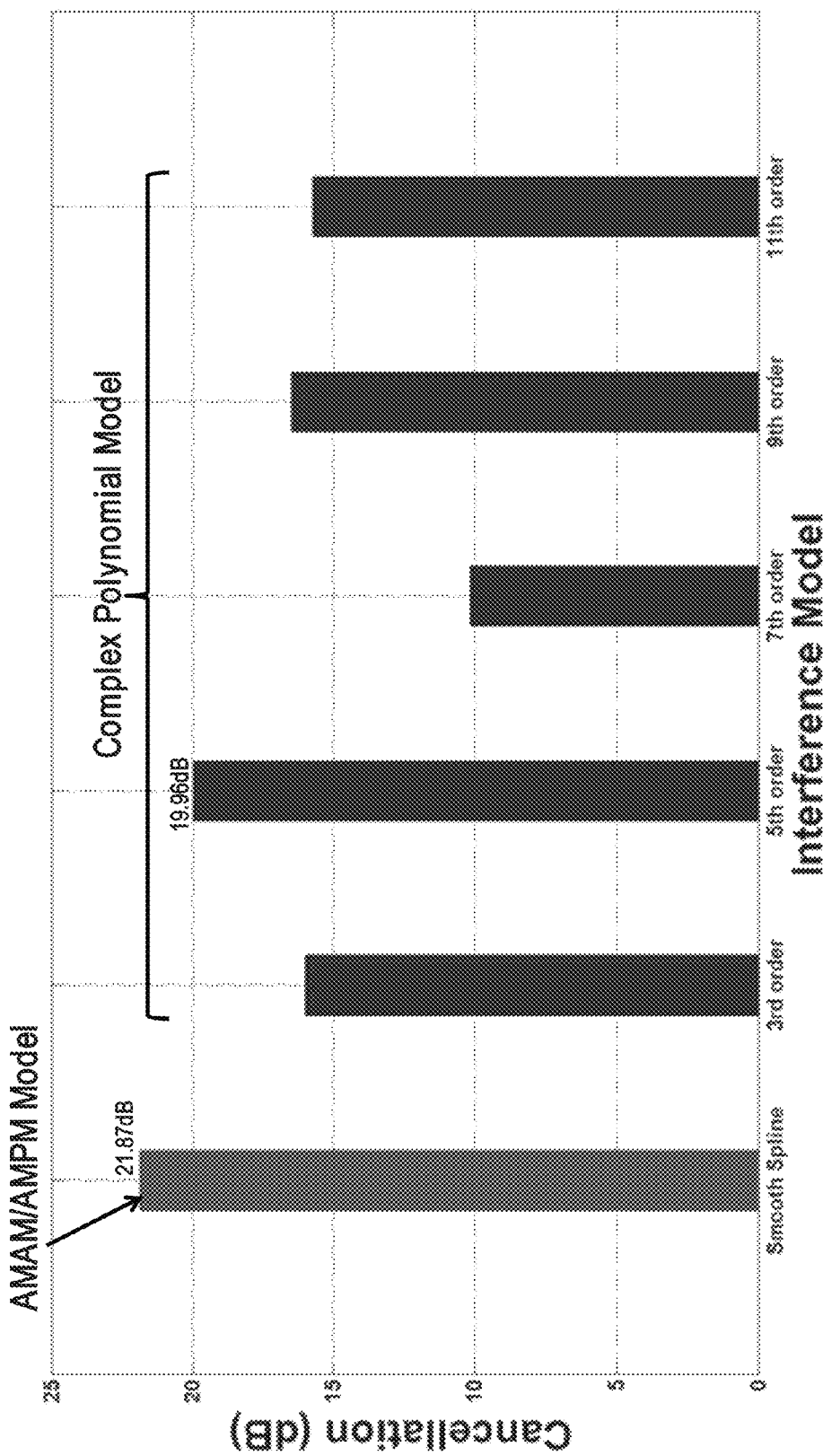
FIG. 28 is a bar graph illustrating the predicted reduction performances of the various interference models of FIG. 25.

FIG. 28 is a bar graph illustrating the predicted reduction performance for each of an embodiment method that uses a continuous AMAM/AMPM map generated from a piecewise smooth spline model, and exemplary methods that uses a 3rd order, 5th order, 7th order, 9th order, and nth order complex polynomial interference model. As can be seen from FIG. 28, the best performing complex polynomial model, which is the 5th order model, only reduces 3rd harmonic interference by 19.96 dB. Higher order complex polynomials do not improve interference reduction. By contrast, the embodiment AMAM/AMPM model is predicted to result in the best reduction performance of 21.87 dB interference reduction relative to the measured 3rd harmonic interference, yet for this embodiment model there is no need to struggle with model order selection.

Figure 29:
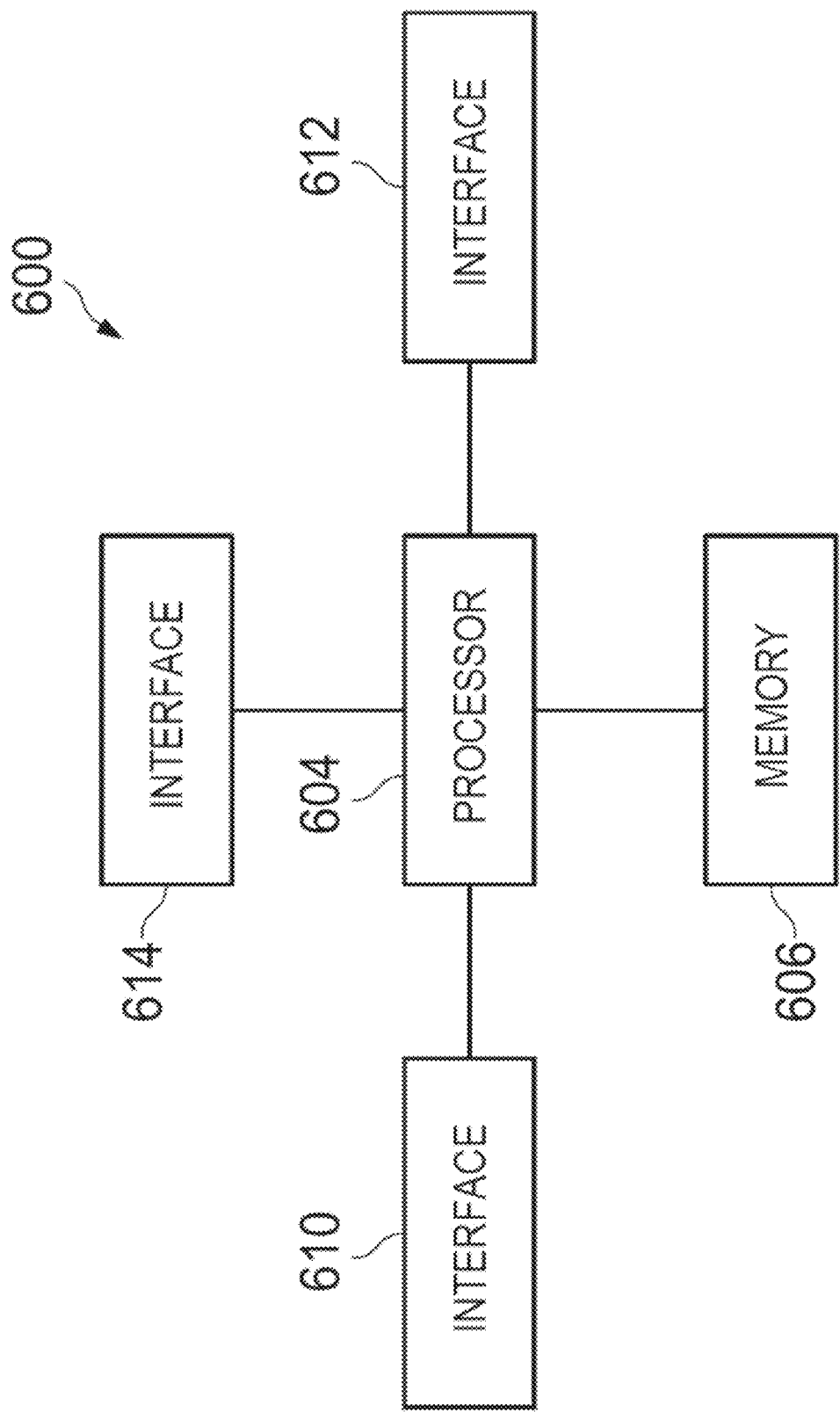
FIG. 29 is a block diagram illustrating an embodiment processing system for performing methods described herein, which may be installed in a host device.

FIG. 29 illustrates a block diagram of an embodiment processing system 600 for performing methods described herein, which may be installed in a host device. As shown, the processing system 600 includes a processor 604, a memory 606, and interfaces 610-614, which may (or may not) be arranged as shown in FIG. 29. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium storing programming for execution by the processor. The programming includes instructions for sampling, at a first time, a baseband transmit signal (a baseband of a transmit signal) to obtain baseband transmit samples. The baseband transmit samples include samples of a baseband transmit phase and samples of a baseband transmit envelope. The programming also includes instructions for sampling, at the first time, an interference signal generated by a harmonic of the transmit signal to obtain interference samples corresponding to the baseband transmit samples. The interference samples include interference phase samples and samples of an interference envelope. The programming also includes instructions for calculating values of a phase shift corresponding to the baseband transmit envelope samples, in accordance with the interference phase samples and the baseband transmit phase samples. The programming also includes instructions for applying a first interpolation, in accordance with the phase shift values and the baseband transmit envelope samples, to determine a first relationship that maps the transmit baseband envelope to the phase shift.

The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in FIG. 29, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network. In some embodiments, one or more of the interfaces 610, 612, 614 connects the processing system 600 to a transceiver (e.g., transceiver 700 of FIG. 1) adapted to transmit and receive signaling over the telecommunications network.

It should be appreciated that one or more steps of the embodiment methods provided herein may be performed by corresponding units or modules. For example, a signal may be generated by a transmitting unit or a transmitting module. A signal may be received by a receiving unit or a receiving module. A signal may be processed by a processing unit or a processing module. Other steps may be performed by a calculating unit/module, an estimating unit/module, a determining unit/module, a generating unit/module, an obtaining unit/module, an adding unit/module, a subtracting unit/module, a sampling unit/module, an interpolating unit/module, a sorting unit/module, a dividing unit/module, a filtering unit/module, a phase-setting unit/module, and/or a left-shifting unit/module. The respective units/modules may be hardware, software, or a combination thereof. For instance, one or more of the units/modules may be an integrated circuit, such as FPGAs or ASICs.

Illustrative embodiments of the present invention model interference using an AMAM mapping and an AMPM mapping to provide the advantages of reducing harmonic TX-to-RX interference while requiring a small number of multiplication operations and consuming low power. Relative to complex polynomial interference modeling, an embodiment of the present invention provides the advantage of avoiding selection of a model order that if not properly fitted may degrade interference reduction. An embodiment of the present invention uses LUT(s) that provide the advantage of a highly flexible chipset design.

The following additional example embodiments of the present invention are also provided. In accordance with a first example embodiment of the present invention, a method for operating a transceiver is provided. The method includes generating, by the transceiver, a first signal that includes an estimate of an interference signal leaked from a transmit path to a receive path of the transceiver. Generating the first signal includes obtaining a baseband transmit signal that includes a baseband of a transmit signal transmitted via the transmit path. Generating the first signal also includes calculating a harmonic phase that includes a phase of a harmonic of the baseband transmit signal. Generating the first signal also includes estimating a phase shift in accordance with an envelope of the baseband transmit signal. Generating the first signal also includes determining a phase of the first signal in accordance with the estimated phase shift and the calculated harmonic phase such that interference of a receive signal received via the receive path is reduced according to the first signal.

Also, the foregoing first example embodiment may be implemented to include one or more of the following additional features. The method may also be implemented such that estimating the phase shift is further in accordance with a first relationship that maps the envelope of the baseband transmit signal to the phase shift.

The method may also be implemented such that it further includes transmitting, by the transceiver, the transmit signal over a transmit band, and receiving, by the transceiver, a receive signal from a receive band during the transmitting, where the receive signal includes the interference signal. In some such implementations, the method further includes subtracting, by the transceiver, the first signal from a receive baseband of the receive signal.

The method may also be implemented such that generating the first signal further includes determining an envelope of the first signal in accordance with the envelope of the baseband transmit signal and in accordance with a second relationship that maps the envelope of the baseband transmit signal to an envelope of the interference signal.

The method may also be implemented such that transmitting the transmit signal includes amplifying the transmit signal using a class AB power amplifier. The method may also be implemented such that estimating the phase shift includes retrieving, in accordance with the envelope of the baseband transmit signal, first mapped values, and estimating the phase shift by applying a first interpolation in accordance with the first mapped values.

The method may also be implemented such that determining the envelope of the first signal includes retrieving, in accordance with the envelope of the baseband transmit signal, second mapped values. In some such implementations, determining the envelope of the first signal further includes applying the first interpolation in accordance with the second mapped values.

The method may also be implemented such that: the first interpolation includes a linear interpolation, the first mapped values are stored in a first LUT, and the second mapped values are stored in a second LUT. In some such implementations, retrieving the first mapped values includes retrieving the first mapped values from the first LUT, and retrieving the second mapped values includes retrieving the second mapped values from the second LUT.

The method may also be implemented to further include sampling a plurality of interference phase values corresponding to a plurality of baseband transmit phase values and a plurality of baseband transmit envelope values, and sampling a plurality of interference envelope values corresponding to the plurality of baseband transmit envelope values. In some such implementations, the method further includes calculating, in accordance with the interference phase values and the baseband transmit phase values, a plurality of phase shift values corresponding to the plurality of baseband transmit envelope values, and applying a second interpolation, in accordance with the phase shift values and the baseband transmit envelope values, to determine the first relationship. In some such implementations, the method also includes applying the second interpolation, in accordance with the interference envelope values and the plurality of baseband transmit envelope values, to determine the second relationship.

The method may also be implemented such that calculating the plurality of phase shift values includes: calculating, in accordance with the baseband transmit phase values, values of the harmonic phase corresponding to the plurality of baseband transmit envelope values. In some such implementations, the plurality of phase shift values are calculated in accordance with the interference phase values and the harmonic phase values.

The method may also be implemented such that applying the second interpolation to determine the first relationship includes sorting the phase shift values, applying a moving average filter to the sorted phase shift values, dividing the sorted phase shift values into intervals in accordance with the plurality of baseband transmit envelope values, calculating a piecewise nonlinearity estimate in accordance with the sorted phase shift values, and applying a smooth spline interpolation to the sorted phase shift values. In some such implementations, applying the second interpolation to determine the second relationship includes sorting the interference envelope values, applying a moving average filter to the sorted interference envelope values, dividing the sorted interference envelope values into intervals in accordance with the plurality of baseband transmit envelope values, calculating a piecewise nonlinearity estimate in accordance with the sorted interference envelope values, and applying a smooth spline interpolation to the sorted interference envelope values.

The method may also be implemented such that calculating the harmonic phase includes setting a second phase equal to a kth multiple of a phase of the baseband transmit signal, where k is a positive integer greater than one. The method may also be implemented such that calculating the harmonic phase further includes iteratively subtracting 360 degrees from the second phase until the second phase is less than 360 degrees.

The method may also be implemented such that: setting the second phase equal to the kth multiple includes setting the second phase equal to a sum of the harmonic phase and 180 degrees, left-shifting the second phase a number 1 times, and adding the harmonic phase to the left-shifted second phase a number m times. In some such implementations, setting the second phase equal to the kth multiple also includes iteratively subtracting 360 degrees from the second phase until the second phase is less than 360 degrees, and after the second phase is less than 360 degrees, subtracting 180 degrees from the second phase. In some such implementations, l is a greatest integer of a base-2-logarithm of k, and m is a difference between k and 2 raised to an lth power.

In accordance with a second example embodiment of the present invention, a transceiver is provided. The transceiver includes at least one antenna. The transceiver also includes a transmit path that includes a first output coupled to the at least one antenna. The transceiver also includes a receive path coupled to the at least one antenna and to the transmit path. When a transmit signal is transmitted via the transmit path and a receive signal is received via the receive path, interference is leaked from the transmit signal to the receive signal. The transceiver also includes a look-up stage coupled to a baseband output of the transmit path. The look-up stage includes at least one of a memory or an integrated circuit. The transceiver also includes an adder coupled between an output of the look-up stage and a second input of the receive path. The look-up stage is configured to map a plurality of baseband transmit envelope values to a plurality of phase shift values. The adder includes an input configured to receive an estimated harmonic of the baseband transmit signal. The baseband transmit signal includes a baseband of the transmit signal.

Also, the foregoing second example embodiment may be implemented to include one or more of the following additional features. The transceiver may also be implemented to further include a linear harmonic phase estimator. In some such implementations, the linear harmonic phase estimator includes an input coupled to the baseband output of the transmit path, an output coupled to the input of the adder, and at least one of a shift register or a processing circuit. In some such implementations, the processing circuit includes a processor and a non-transitory computer readable medium storing programming for execution by the processor.

The transceiver may also be implemented to further include a second look-up stage coupled to the baseband output of the transmit path, where the second-look up stage includes at least one of a memory or an integrated circuit, and the second look-up stage is configured to map a plurality of baseband envelope values to a plurality of interference envelope values.

The transceiver may also be implemented to further include an adder-subtractor circuit coupled to an output of the adder and to an output of the receive path.

The transceiver may also be implemented to further include a CORDIC. In some such implementations, the CORDIC includes a phase input coupled to an output of the adder and an envelope input coupled to an output of the second look-up stage. In some such implementations, the CORDIC also includes an I output coupled to the adder-subtractor circuit and a Q output coupled to the adder-subtractor circuit, where the output of the receive path includes an I receive output and a Q receive output.

The transceiver may also be implemented to further include a complex ARMA filter coupled between the I output of the CORDIC and the adder-subtractor circuit and between the Q output of the CORDIC and the adder-subtractor circuit. The transceiver may also be implemented such that the linear harmonic phase estimator includes the processing circuit, the programming includes instructions to estimate a kth harmonic of the transmit signal by multiplying a phase of the baseband transmit signal by a number k, the number k is a positive integer greater than one, and the harmonic of the transmit signal includes a kth harmonic of the transmit signal.

The transceiver may also be implemented such that the linear harmonic phase estimator includes the shift register, a second adder, and a number k−1 of phase adjustment stages, each including a comparator and a switch. In some such implementations, k is a positive integer greater than one and the linear harmonic phase estimator is configured to estimate a kth harmonic of the transmit signal. The transceiver may also be implemented such that the transmit path further includes a class AB amplifier.

In accordance with a third example embodiment of the present invention, an interference modeling system is provided. The interference modeling system includes a processor and a non-volatile computer readable medium storing programming for execution by the processor. The programming includes instructions for sampling, at a first time, a baseband transmit signal that includes a baseband of a transmit signal, to obtain baseband transmit samples. The baseband transmit samples include samples of a baseband transmit phase and samples of a baseband transmit envelope. The programming also includes instructions for sampling, at the first time, an interference signal generated by a harmonic of the transmit signal to obtain interference samples corresponding to the baseband transmit samples. The interference samples include interference phase samples and samples of an interference envelope. The programming also includes instructions for calculating values of a phase shift corresponding to the baseband transmit envelope samples, in accordance with the interference phase samples and the baseband transmit phase samples. The programming also includes instructions for applying a first interpolation, in accordance with the phase shift values and the baseband transmit envelope samples, to determine a first relationship that maps the transmit baseband envelope to the phase shift.

Also, the foregoing third example embodiment may be implemented to include one or more of the following additional features. The system may also be implemented such that the programming further includes instructions for applying the first interpolation, in accordance with the interference envelope samples and the baseband transmit envelope samples, to determine a second relationship. In some such implementations, the second relationship maps the baseband transmit envelope to the interference envelope.

The system may also be implemented such that the instructions for calculating the phase shift values include instructions for calculating, in accordance with the baseband transmit phase samples, first phase values of a harmonic signal of the baseband transmit signal. In some such implementations, the instructions for calculating the phase shift values do so in accordance with the interference phase samples and the first phase values of the harmonic signal of the baseband transmit signal.

The system may also be implemented such that the instructions for applying the first interpolation to determine the first relationship include instructions for sorting the phase shift values, applying a moving average filter to the sorted phase shift values, dividing the sorted phase shift values into intervals in accordance with the baseband transmit envelope samples, calculating a piecewise nonlinearity estimate in accordance with the sorted phase shift values, and applying a smooth spline interpolation to the sorted phase shift values. In some such implementations, the instructions for applying the first interpolation to determine the second relationship include instructions for sorting the interference envelope samples, applying a moving average filter to the sorted interference envelope samples, dividing the sorted interference envelope samples into intervals in accordance with the baseband transmit envelope samples, calculating a piecewise nonlinearity estimate in accordance with the sorted interference envelope samples, and applying a smooth spline interpolation to the sorted interference envelope samples.

The system may also be implemented such that the programming further includes instructions for: sampling, at a second time, the baseband transmit signal to obtain second baseband transmit samples including second baseband transmit phase samples and second baseband transmit envelope samples. In some such implementations, the programming further includes sampling, at the second time, an interference signal generated by a harmonic of the transmit signal to obtain second interference samples corresponding to the second baseband transmit samples. In some such implementations, the programming further includes instructions for calculating, in accordance with the second baseband transmit phase samples, second phase values of a harmonic of the baseband transmit signal, and estimating second phase shift values in accordance with the second baseband transmit envelope samples and in accordance with the first relationship. In some such implementations, the programming further includes instructions for determining an interference phase estimate in accordance with the second phase shift values and the second phase values of the harmonic of the baseband transmit signal, and determining an interference envelope estimate in accordance with the second baseband transmit envelope samples and in accordance with the second relationship.

The system may also be implemented such that the programming further includes instructions for transmitting the transmit signal over a transmit band, and receiving a receive signal from a receive band during the transmitting, where the receive signal includes the interference signal. In some such implementations, the programming further includes instructions for generating an interference estimate in accordance with the interference envelope estimate and the interference phase estimate, and subtracting the interference estimate from a receive baseband of the receive signal.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating a transceiver, comprising:
generating, by the transceiver, a first signal comprising an estimate of an interference signal leaked from a transmit path to a receive path of the transceiver, wherein the generating the first signal comprises:
obtaining a baseband transmit signal comprising a baseband of a transmit signal transmitted via the transmit path;
calculating a harmonic phase comprising a phase of a harmonic of the baseband transmit signal;
estimating a phase shift in accordance with an envelope of the baseband transmit signal; and
determining a phase of the first signal in accordance with the estimated phase shift and the calculated harmonic phase, wherein interference of a receive signal received via the receive path is reduced according to the first signal.

2. The method of claim 1, wherein estimating the phase shift is further in accordance with a first relationship that maps the envelope of the baseband transmit signal to the phase shift.

3. The method of claim 2, further comprising:
transmitting, by the transceiver, the transmit signal over a transmit band;
receiving, by the transceiver, the receive signal from a receive band during the transmitting, the receive signal comprising the interference signal; and
subtracting, by the transceiver, the first signal from a receive baseband of the receive signal.

4. The method of claim 3, wherein:
generating the first signal further comprises determining an envelope of the first signal in accordance with the envelope of the baseband transmit signal and in accordance with a second relationship that maps the envelope of the baseband transmit signal to an envelope of the interference signal.

5. The method of claim 4, wherein transmitting the transmit signal comprises amplifying the transmit signal using a class AB power amplifier.

6. The method of claim 4, wherein estimating the phase shift comprises:
retrieving, in accordance with the envelope of the baseband transmit signal, first mapped values; and
estimating the phase shift by applying a first interpolation in accordance with the first mapped values.

7. The method of claim 6, wherein determining the envelope of the first signal comprises:
retrieving, in accordance with the envelope of the baseband transmit signal, second mapped values; and
determining the envelope of the first signal by applying the first interpolation in accordance with the second mapped values.

8. The method of claim 7, wherein:
the first interpolation comprises a linear interpolation;
the first mapped values are stored in a first look-up table (LUT);
the second mapped values are stored in a second LUT;
retrieving the first mapped values comprises retrieving the first mapped values from the first LUT; and
retrieving the second mapped values comprises retrieving the second mapped values from the second LUT.

9. The method of claim 6, further comprising:
sampling a plurality of interference phase values corresponding to a plurality of baseband transmit phase values and a plurality of baseband transmit envelope values;
sampling a plurality of interference envelope values corresponding to the plurality of baseband transmit envelope values;
calculating, in accordance with the interference phase values and the baseband transmit phase values, a plurality of phase shift values corresponding to the plurality of baseband transmit envelope values;
applying a second interpolation, in accordance with the phase shift values and the baseband transmit envelope values, to determine the first relationship; and
applying the second interpolation, in accordance with the interference envelope values and the plurality of baseband transmit envelope values, to determine the second relationship.

10. The method of claim 9, wherein calculating the plurality of phase shift values comprises:
calculating, in accordance with the baseband transmit phase values, values of the harmonic phase corresponding to the plurality of baseband transmit envelope values; and
calculating, in accordance with the interference phase values and the harmonic phase values, the plurality of phase shift values.

11. The method of claim 10, wherein:
applying the second interpolation to determine the first relationship comprises:
sorting the phase shift values;
applying a moving average filter to the sorted phase shift values;
dividing the sorted phase shift values into intervals in accordance with the plurality of baseband transmit envelope values;
calculating a piecewise nonlinearity estimate in accordance with the sorted phase shift values;
applying a smooth spline interpolation to the sorted phase shift values; and
applying the second interpolation to determine the second relationship comprises:
sorting the interference envelope values;
applying a moving average filter to the sorted interference envelope values;
dividing the sorted interference envelope values into intervals in accordance with the plurality of baseband transmit envelope values;
calculating a piecewise nonlinearity estimate in accordance with the sorted interference envelope values; and
applying a smooth spline interpolation to the sorted interference envelope values.

12. The method of claim 1, wherein calculating the harmonic phase comprises setting a second phase equal to a kth multiple of a phase of the baseband transmit signal, wherein k is a positive integer greater than one.

13. The method of claim 12, wherein calculating the harmonic phase further comprises iteratively subtracting 360 degrees from the second phase until the second phase is less than 360 degrees.

14. The method of claim 12, wherein:
setting the second phase equal to the kth multiple comprises:
setting the second phase equal to a sum of the harmonic phase and 180 degrees;
left-shifting the second phase a number l times; and
adding the harmonic phase to the left-shifted second phase a number m times;
iteratively subtracting 360 degrees from the second phase until the second phase is less than 360 degrees; and
after the second phase is less than 360 degrees, subtracting 180 degrees from the second phase;
l is a greatest integer of a base-2-logarithm of k; and
m is a difference between k and 2 raised to an lth power.

15. A transceiver comprising:
at least one antenna;
a transmit path comprising a first output coupled to the at least one antenna;
a receive path coupled to the at least one antenna and to the transmit path such that when a transmit signal is transmitted via the transmit path and a receive signal is received via the receive path, interference is leaked from the transmit signal to the receive signal;
a look-up stage coupled to a baseband output of the transmit path, the look-up stage comprising at least one of a memory or an integrated circuit; and
an adder coupled between an output of the look-up stage and a second input of the receive path, wherein:
the look-up stage is configured to map a plurality of baseband envelope values to a plurality of phase shift values; and
the adder comprises an input configured to receive an estimated harmonic of a baseband transmit signal, the baseband transmit signal comprising a baseband of the transmit signal.

16. The transceiver of claim 15, wherein the transceiver further comprises:
a linear harmonic phase estimator, comprising:
an input coupled to the baseband output of the transmit path;
an output coupled to the input of the adder; and
at least one of a shift register or a processing circuit, the processing circuit comprising a processor and a non-transitory computer readable medium storing programming for execution by the processor.

17. The transceiver of claim 16, further comprising:
a second look-up stage coupled to the baseband output of the transmit path, the second look-up stage comprising at least one of a memory or an integrated circuit, wherein the second look-up stage is configured to map a plurality of baseband envelope values to a plurality of interference envelope values.

18. The transceiver of claim 17, further comprising:
an adder-subtractor circuit coupled to an output of the adder and to an output of the receive path.

19. The transceiver of claim 18, further comprising:
a coordinate rotation digital computer (CORDIC) comprising:
  a phase input coupled to the output of the adder;
  an envelope input coupled to an output of the second look-up stage;
  an in-phase (I) output coupled to the adder-subtractor circuit; and
  a quadrature (Q) output coupled to the adder-subtractor circuit,
    wherein the output of the receive path comprises an I receive output and a Q receive output.

20. The transceiver of claim 19, further comprising:
a complex auto-regressive-moving-average (ARMA) filter coupled between the I output of the CORDIC and the adder-subtractor circuit and between the Q output of the CORDIC and the adder-subtractor circuit.

21. The transceiver of claim 16, wherein:
the linear harmonic phase estimator comprises the processing circuit;
the programming comprises instructions to estimate a kth harmonic of the transmit signal by multiplying a phase of the baseband transmit signal by a number k; and
the number k is a positive integer greater than one.

22. The transceiver of claim 16, wherein:
the linear harmonic phase estimator comprises:
  the shift register;
  a second adder; and
  a number k−1 of phase adjustment stages, each comprising a comparator and a switch,
    wherein k is a positive integer greater than one; and
    wherein the linear harmonic phase estimator is configured to estimate a kth harmonic of the transmit signal.

23. The transceiver of claim 16, wherein the transmit path further comprises a class AB amplifier.

24. An interference modeling system comprising:
a processor;
a non-volatile computer readable medium storing programming for execution by the processor, the programming comprising instructions for:
  sampling, at a first time, a baseband transmit signal comprising a baseband of a transmit signal to obtain baseband transmit samples comprising samples of a baseband transmit phase and samples of a baseband transmit envelope;
  sampling, at the first time, an interference signal generated by a harmonic of the transmit signal to obtain interference samples corresponding to the baseband transmit samples, the interference samples comprising interference phase samples and samples of an interference envelope;
  calculating values of a phase shift corresponding to the baseband transmit envelope samples, in accordance with the interference phase samples and the baseband transmit phase samples; and
  applying a first interpolation, in accordance with the phase shift values and the baseband transmit envelope samples, to determine a first relationship that maps the transmit baseband envelope to the phase shift.

25. The system of claim 24, wherein the programming further comprises instructions for:
applying the first interpolation, in accordance with the interference envelope samples and the baseband transmit envelope samples, to determine a second relationship that maps the baseband transmit envelope to the interference envelope.

26. The system of claim 25, wherein the instructions for calculating the phase shift values comprise instructions for:
calculating, in accordance with the baseband transmit phase samples, first phase values of a harmonic signal of the baseband transmit signal; and
calculating the phase shift values in accordance with the interference phase samples and the first phase values of the harmonic signal of the baseband transmit signal.

27. The system of claim 26, wherein:
the instructions for applying the first interpolation to determine the first relationship comprise instructions for:
  sorting the phase shift values;
  applying a moving average filter to the sorted phase shift values;
  dividing the sorted phase shift values into intervals in accordance with the baseband transmit envelope samples;
  calculating a piecewise nonlinearity estimate in accordance with the sorted phase shift values; and
  applying a smooth spline interpolation to the sorted phase shift values; and
the instructions for applying the first interpolation to determine the second relationship comprise instructions for:
  sorting the interference envelope samples;
  applying a moving average filter to the sorted interference envelope samples;
  dividing the sorted interference envelope samples into intervals in accordance with the baseband transmit envelope samples;
  calculating a piecewise nonlinearity estimate in accordance with the sorted interference envelope samples; and
  applying a smooth spline interpolation to the sorted interference envelope samples.

28. The system of claim 27, wherein the programming further comprises instructions for:
sampling, at a second time, the baseband transmit signal to obtain second baseband transmit samples comprising second baseband transmit phase samples and second baseband transmit envelope samples;
sampling, at the second time, an interference signal generated by a harmonic of the transmit signal to obtain second interference samples corresponding to the second baseband transmit samples;
calculating, in accordance with the second baseband transmit phase samples, second phase values of a harmonic of the baseband transmit signal;
estimating second phase shift values in accordance with the second baseband transmit envelope samples and in accordance with the first relationship;

determining an interference phase estimate in accordance with the second phase shift values and the second phase values of the harmonic of the baseband transmit signal; and determining an interference envelope estimate in accordance with the second baseband transmit envelope samples and in accordance with the second relationship.

29. The system of claim 28, wherein the programming further comprises instructions for:

transmitting the transmit signal over a transmit band;

receiving a receive signal from a receive band during the transmitting, the receive signal comprising the interference signal;

generating an interference estimate in accordance with the interference envelope estimate and the interference phase estimate; and subtracting the interference estimate from a receive baseband of the receive signal.

* * * * *